United States Patent
Park et al.

(10) Patent No.: US 11,856,543 B2
(45) Date of Patent: Dec. 26, 2023

(54) METHOD FOR ADJUSTING TIMING FOR IAB AND NODE USING SAME

(71) Applicant: LG ELECTRONICS INC., Seoul (KR)

(72) Inventors: Haewook Park, Seoul (KR); Hyangsun You, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/788,278

(22) PCT Filed: Dec. 23, 2020

(86) PCT No.: PCT/KR2020/019016
§ 371 (c)(1),
(2) Date: Jun. 22, 2022

(87) PCT Pub. No.: WO2021/133066
PCT Pub. Date: Jul. 1, 2021

(65) Prior Publication Data
US 2023/0037808 A1 Feb. 9, 2023

(30) Foreign Application Priority Data
Dec. 23, 2019 (KR) .................. 10-2019-0172765

(51) Int. Cl.
*H04W 56/00* (2009.01)
(52) U.S. Cl.
CPC .............. *H04W 56/0045* (2013.01)

(58) Field of Classification Search
CPC ........ G01S 13/765; G01S 5/0205; G01S 5/10; G01S 1/20; G01S 11/06; G01S 13/75;
(Continued)

(56) References Cited

U.S. PATENT DOCUMENTS 10,958,511 B2 * 3/2021 Majmundar .......... H04W 24/02
2019/0313433 A1 * 10/2019 Abedini ............ H04W 72/0446
(Continued)

FOREIGN PATENT DOCUMENTS

EP        4075889 A1 * 10/2022
WO    2019194737       10/2019
(Continued)

OTHER PUBLICATIONS

PCT International Application No. PCT/KR2020/019016, International Search Report dated Mar. 15, 2021, 5 pages.
(Continued)

*Primary Examiner* — Nathan S Taylor
(74) *Attorney, Agent, or Firm* — LEE HONG DEGERMAN KANG WAIMEY

(57) ABSTRACT

The present specification provides a method for performing an integrated access and backhaul (IAB) operation performed by a node in a wireless communication system, and an apparatus therefor, the method comprising: performing an initial access operation with another node; receiving, from the other node, at least one piece of timing advance (TA) information or T delta information, wherein downlink transmission timing of the node and uplink transmission timing of the node are aligned or determined on the basis of the at least one piece of TA information or T delta information; and performing the IAB operation on the basis of the downlink transmission timing and the uplink transmission timing.

5 Claims, 32 Drawing Sheets

(58) Field of Classification Search
CPC .. G01S 13/76; G01S 5/02; G01S 5/06; H04W 56/009; H04W 64/003; H04W 64/006; H04W 56/00; H04W 64/00; H04W 24/02; H04W 24/10; H04W 4/02; H04W 4/33; H04W 88/00; H04W 52/0206; H04W 52/0212; H04W 52/0225; H04W 52/0251; H04W 52/0229; H04W 84/12; H04W 88/06; H04W 52/02; H04W 56/0045; H04W 84/04; H04W 56/0005; H04W 56/004; H04W 84/047; H04L 43/106; H04L 5/00; H04B 17/27
See application file for complete search history.

(56) References Cited

U.S. PATENT DOCUMENTS

| | | | | |
|---|---|---|---|---|
| 2020/0053682 | A1* | 2/2020 | Abedini | H04W 56/0025 |
| 2020/0145952 | A1* | 5/2020 | Keskitalo | H04W 56/007 |
| 2021/0345262 | A1* | 11/2021 | Harada | H04W 88/14 |
| 2021/0352607 | A1* | 11/2021 | Miao | H04W 56/0045 |
| 2022/0345285 | A1* | 10/2022 | You | H04W 84/04 |
| 2023/0034003 | A1* | 2/2023 | Kurita | H04W 56/001 |
| 2023/0034529 | A1* | 2/2023 | You | H04W 56/0045 |

FOREIGN PATENT DOCUMENTS

| | | | | |
|---|---|---|---|---|
| WO | WO-2019194737 | A1 * | 10/2019 | H04L 67/141 |
| WO | WO-2020086826 | A1 * | 4/2020 | H04B 7/15 |

OTHER PUBLICATIONS

3rd Generation Partnership Project (3GPP), "Technical Specification Group Radio Access Network; NR; Study on Integrated Access and Backhaul (Release 16)," 3GPP TR 38.874 V16.0.0, Jan. 2019, 113 pages.

Brd Generation Partnership Project (3GPP), "Technical Specification Group Radio Access Network; NR; Study on Integrated Access and Backhaul (Release 16)," 3GPP TR 38.872 V16.0.0, Jan. 2019, 113 pages.

Samsung, "Introduction of integrated access and backhaul," 3GPP TSG-RAN WG1 #99, R1-1913186, Nov. 2019, 5 pages.

ZTE, "TP for Timing Delta MAC CE," 3GPP TSG-RAN WG2 #108, R2-1916538, Nov. 2019, 6 pages.

* cited by examiner

FIG. 24 transmit the at least one piece of TA information or
T delta information to the child node
(the downlink transmission timing of the child node
and the uplink transmission timing of the child node
may be aligned based on the at least one piece of
TA information or T delta information) — S2410

METHOD FOR ADJUSTING TIMING FOR IAB AND NODE USING SAME

CROSS-REFERENCE TO RELATED APPLICATIONS

This application is the National Stage filing under 35 U.S.C. 371 of International Application No. PCT/KR2020/019016, filed on Dec. 23, 2020, which claims the benefit of earlier filing date and right of priority to Korean Application No. 10-2019-0172765, filed on Dec. 23, 2019, the contents of which are all incorporated by reference herein in their entireties.

BACKGROUND OF THE DISCLOSURE

Field of the Disclosure

The present specification relates to wireless communication.

Related Art

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new radio access technology (new RAT or NR).

On the other hand, integrated access and backhaul link may be provided. Hereinafter, in this specification, features for Integrated Access Backhaul (IAB) will be provided.

SUMMARY OF THE DISCLOSURE

Technical Solutions

According to an embodiment of the present specification, a method for receiving, from the another node, at least one timing advance (TA) information or T delta information, where downlink transmission timing of the node and uplink transmission timing of the node are aligned or determined based on the at least one TA information or T delta information, and performing the IAB operation based on the downlink transmission timing and the uplink transmission timing may be provided.

Effects of the Disclosure

According to the present specification, when a node performs an IAB operation, it may become clear in which manner to perform timing alignment, so that stability and efficiency of wireless communication may be increased.

The effects that can be obtained through a specific example of the present specification are not limited to the effects listed above. For example, there may be various technical effects that a person having ordinary skill in the related art can understand or derive from the present specification. Accordingly, specific effects of the present specification are not limited to those explicitly described in the present specification, and may include various effects that can be understood or derived from the technical features of the present specification.

BRIEF DESCRIPTION OF THE DRAWINGS

FIG. 24 is a flowchart of a method of transmitting at least one piece of timing advance (TA) information or T delta information (from the viewpoint of another node) according to an embodiment of the present specification.

information or T delta information (from the perspective of another node) according to an embodiment of the present specification.

Figure 26:
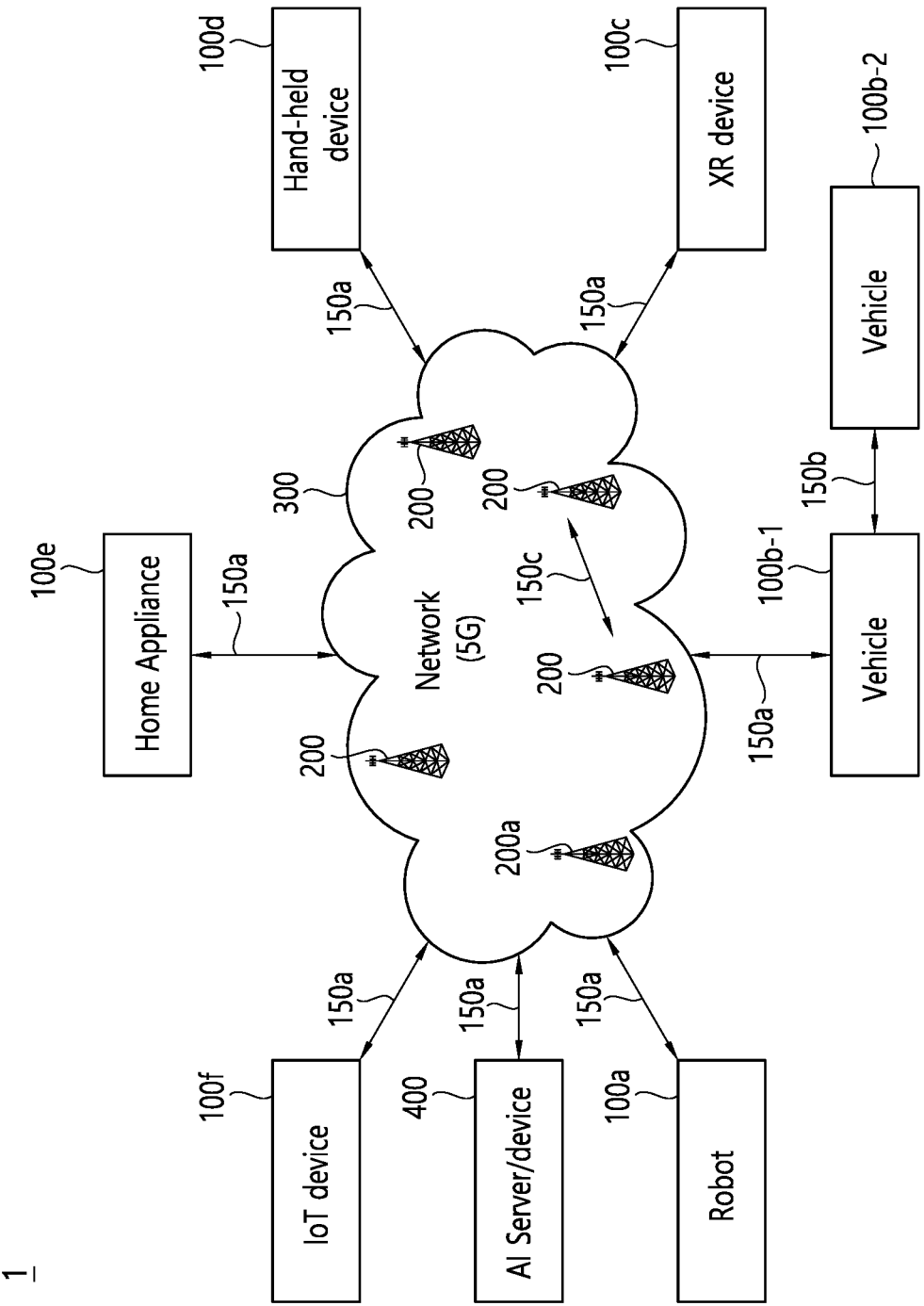

FIG. 26 shows an exemplary communication system (1), according to an embodiment of the present specification.

Figure 27:
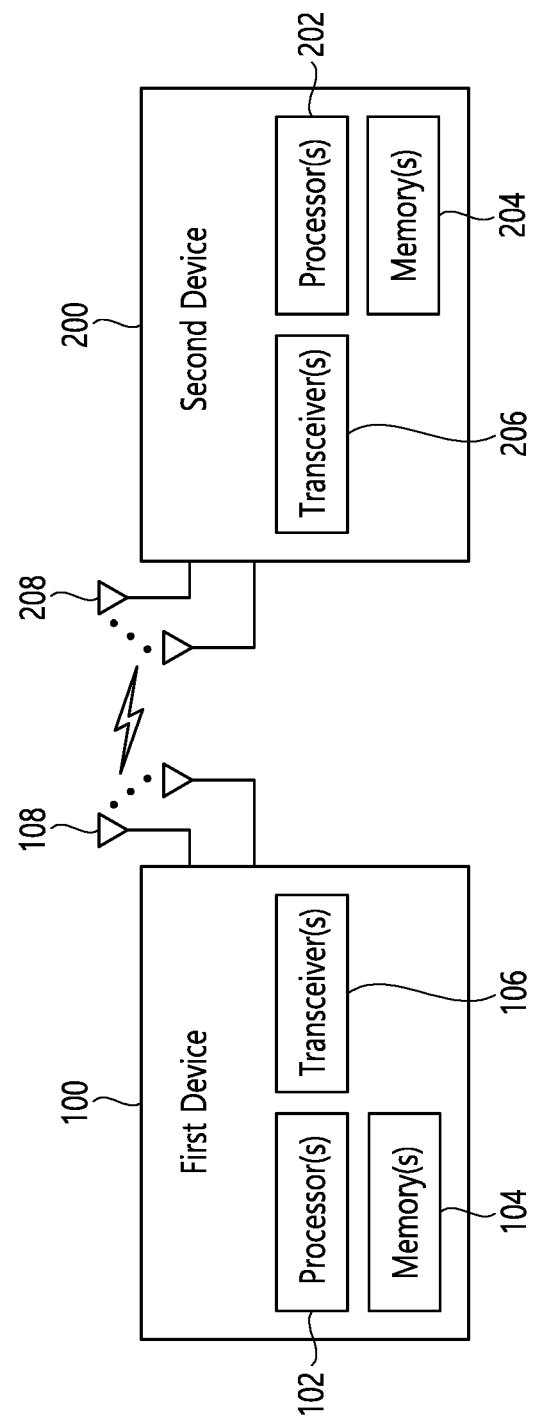

FIG. 27 shows an exemplary wireless device to which the present specification can be applied.

Figure 28:
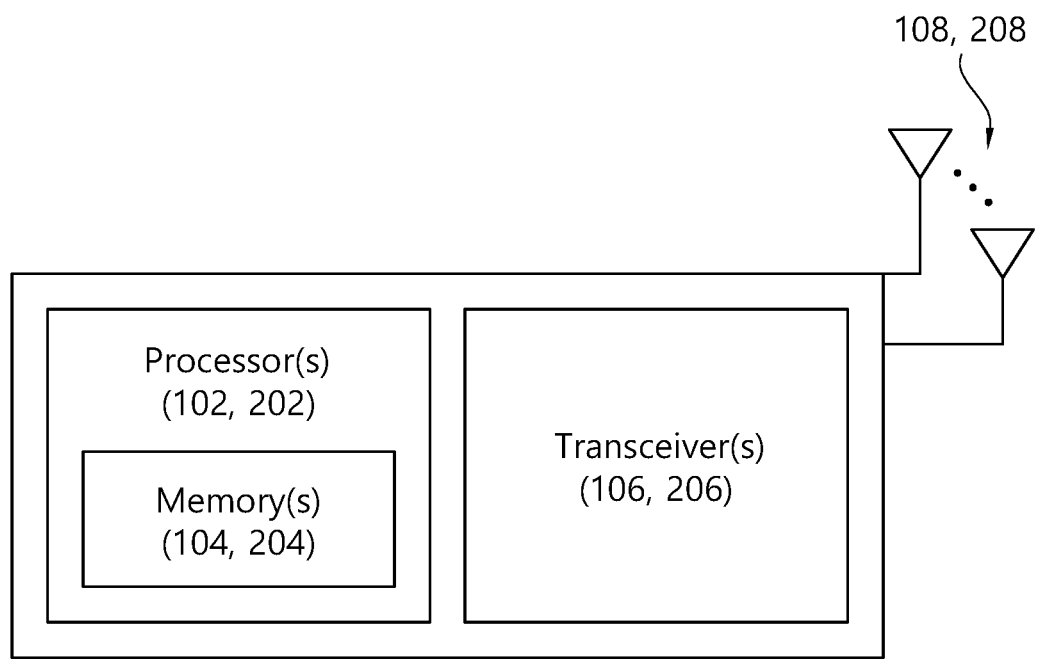

FIG. 28 shows another example of a wireless device applicable to the present specification.

Figure 29:
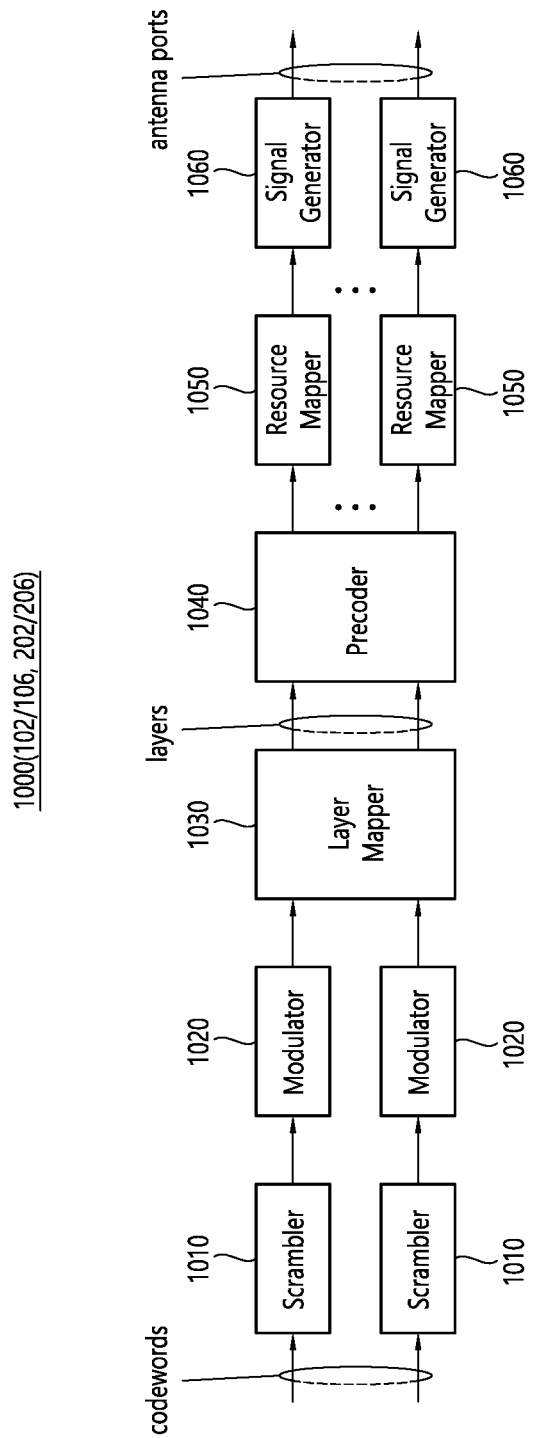

FIG. 29 shows a signal process circuit for a transmission signal according to an embodiment of the present specification.

Figure 30:
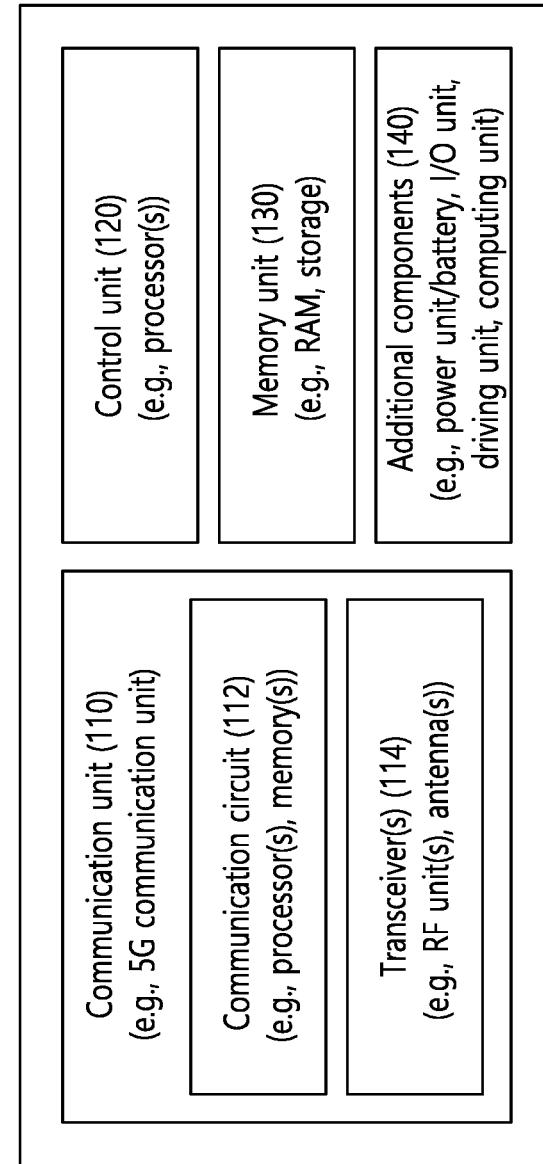

FIG. 30 shows another example of a wireless device according to an embodiment of the present specification.

Figure 31:
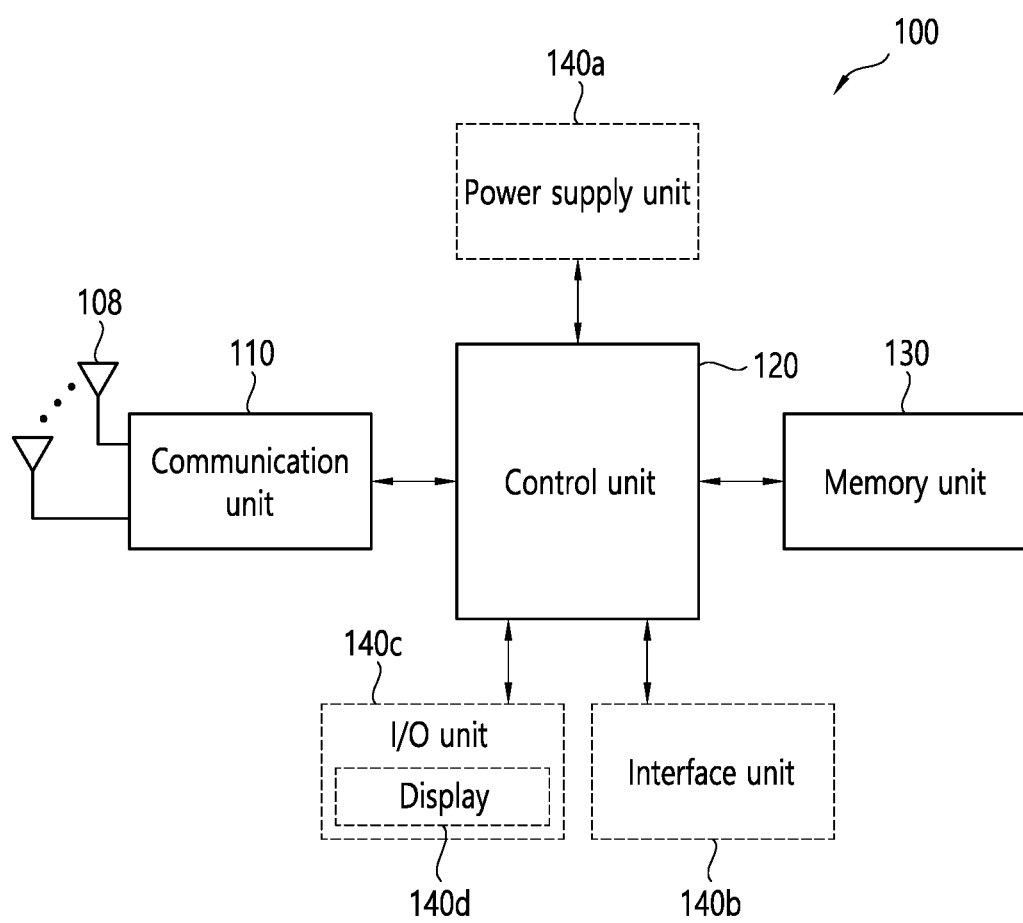

FIG. 31 shows a hand-held device to which the present specification is applied.

Figure 32:
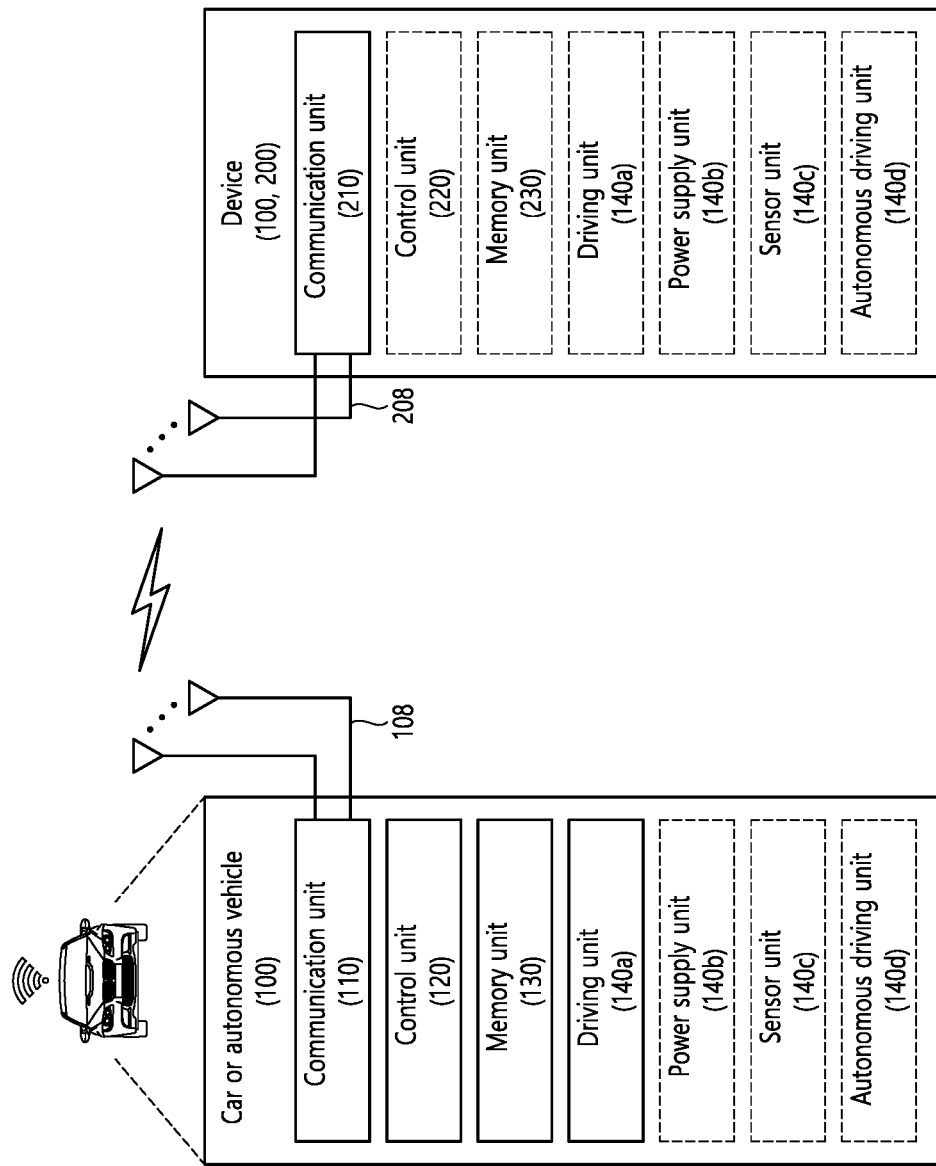

FIG. 32 shows a vehicle or an autonomous vehicle to which the present specification is applied.

DESCRIPTION OF EXEMPLARY EMBODIMENTS

In the present specification, "A or B" may mean "only A", "only B" or "both A and B". In other words, in the present specification, "A or B" may be interpreted as "A and/or B". For example, in this specification, "A, B or C" refers to "only A", "only B", "only C", or "any combination of A, B and C".

A forward slash (/) or comma used herein may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" can be interpreted the same as "at least one of A and B".

In addition, in the present specification, "at least one of A, B and C" means "only A", "only B", "only C", or "any combination of A, B and C". In addition, "at least one of A, B or C" or "at least one of A, B and/or C" can mean "at least one of A, B and C".

In addition, parentheses used in the present specification may mean "for example". Specifically, when described as "control information (PDCCH)", "PDCCH" may be proposed as an example of "control information". In other words, "control information" of the present specification is not limited to "PDCCH", and "PDDCH" may be suggested as an example of "control information". In addition, even when described as "control information (i.e., PDCCH)", "PDCCH" may be proposed as an example of "control information".

In the present specification, technical features that are individually described in one drawing may be implemented individually or at the same time.

Figure 1:
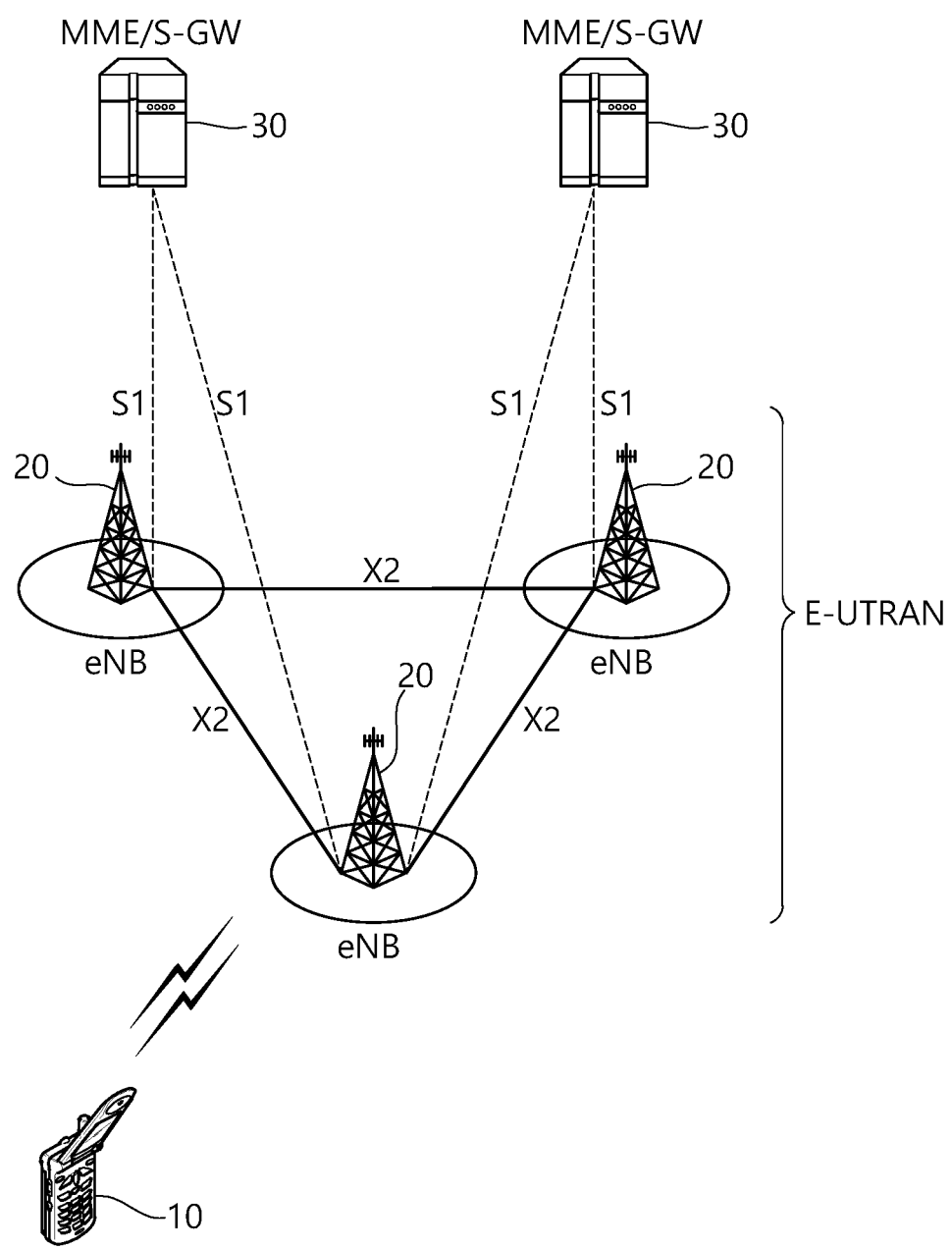
FIG. 1 illustrates a wireless communication system.

FIG. 1 illustrates a wireless communication system. The wireless communication system may also be referred to as an evolved-UMTS terrestrial radio access network (E-UTRAN), or long term evolution (LTE)/LTE-A system.

The E-UTRAN includes at least one base station (BS) (20) which provides a control plane and a user plane to a user equipment (UE) (10). The UE (10) may be fixed or mobile, and may be referred to as another terminology, such as a mobile station (MS), a user terminal (UT), a subscriber station (SS), a mobile terminal (MT), a wireless device, and so on. The BS (20) is generally a fixed station that communicates with the UE (10) and may be referred to as another terminology, such as an evolved node-B (eNB), a base transceiver system (BTS), an access point, and so on.

The BSs (20) are interconnected by means of an X2 interface. The BSs (20) are also connected by means of an S1 interface to an evolved packet core (EPC) (30), more specifically, to a mobility management entity (MME) through S1-MME and to a serving gateway (S-GW) through S1-U.

The EPC (30) includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
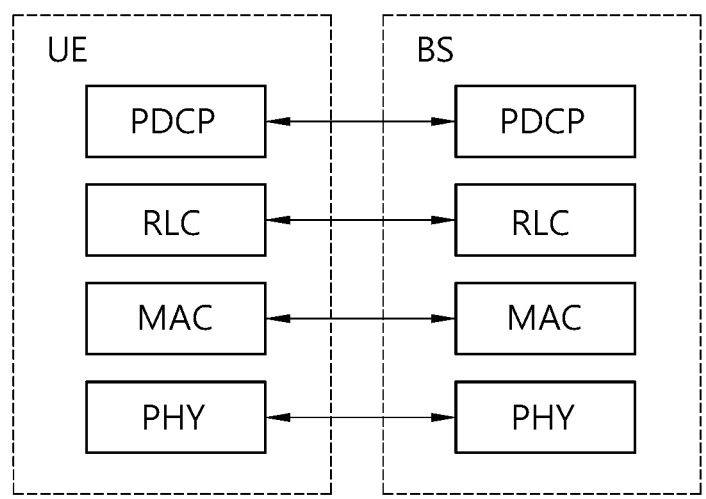
FIG. 2 is a diagram showing a wireless protocol architecture for a user plane.
Figure 3:
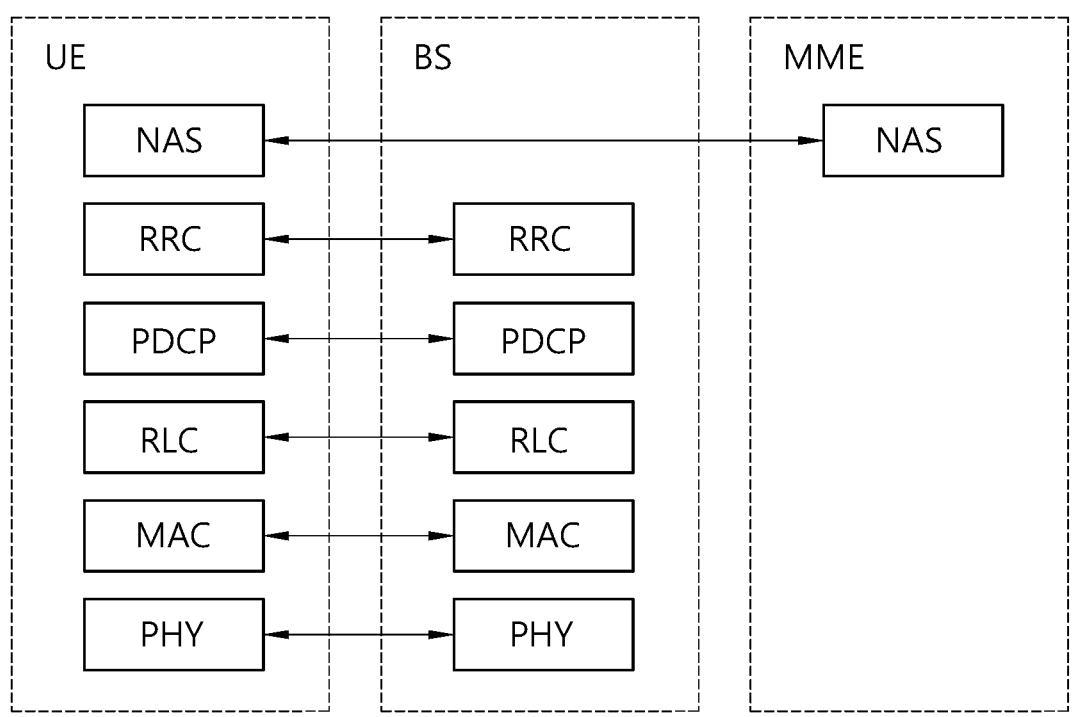
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new RAT or NR.

Figure 4:
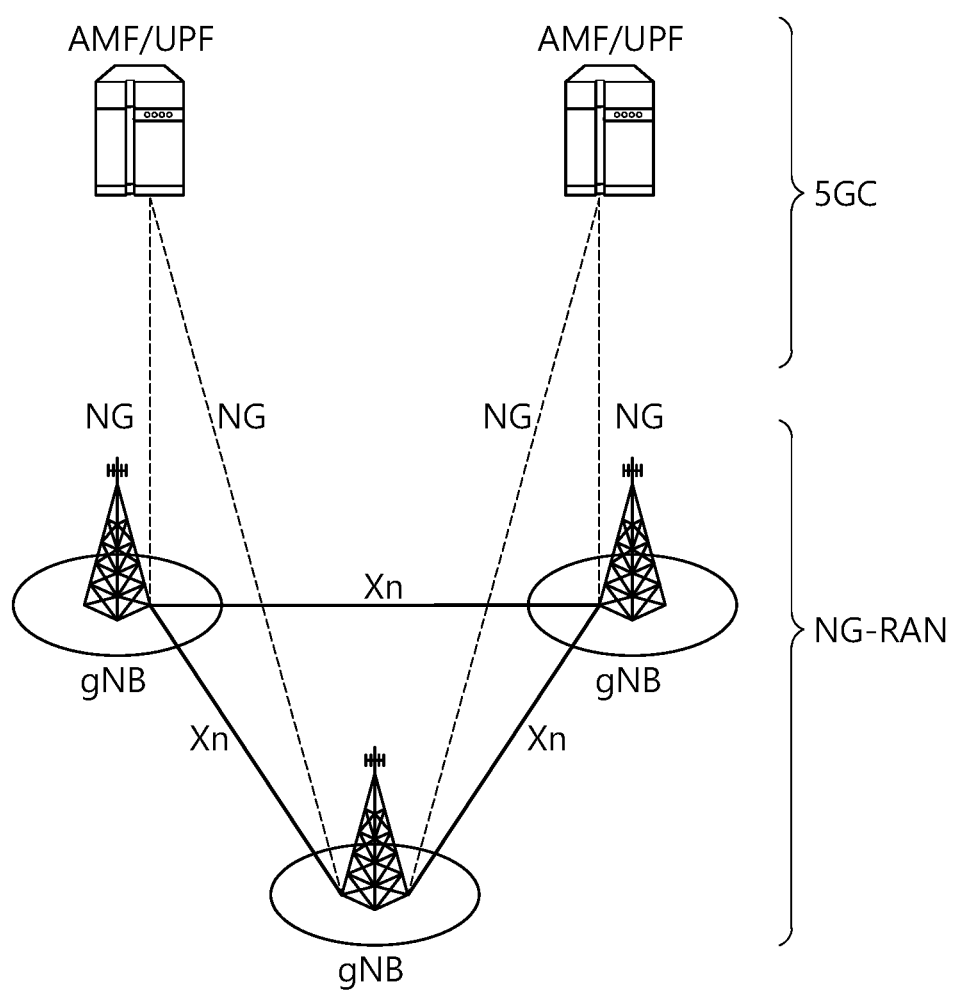
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, the NG-RAN may include a gNB and/or an eNB providing a user plane and a control plane protocol termination to a terminal. FIG. 4 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 5:
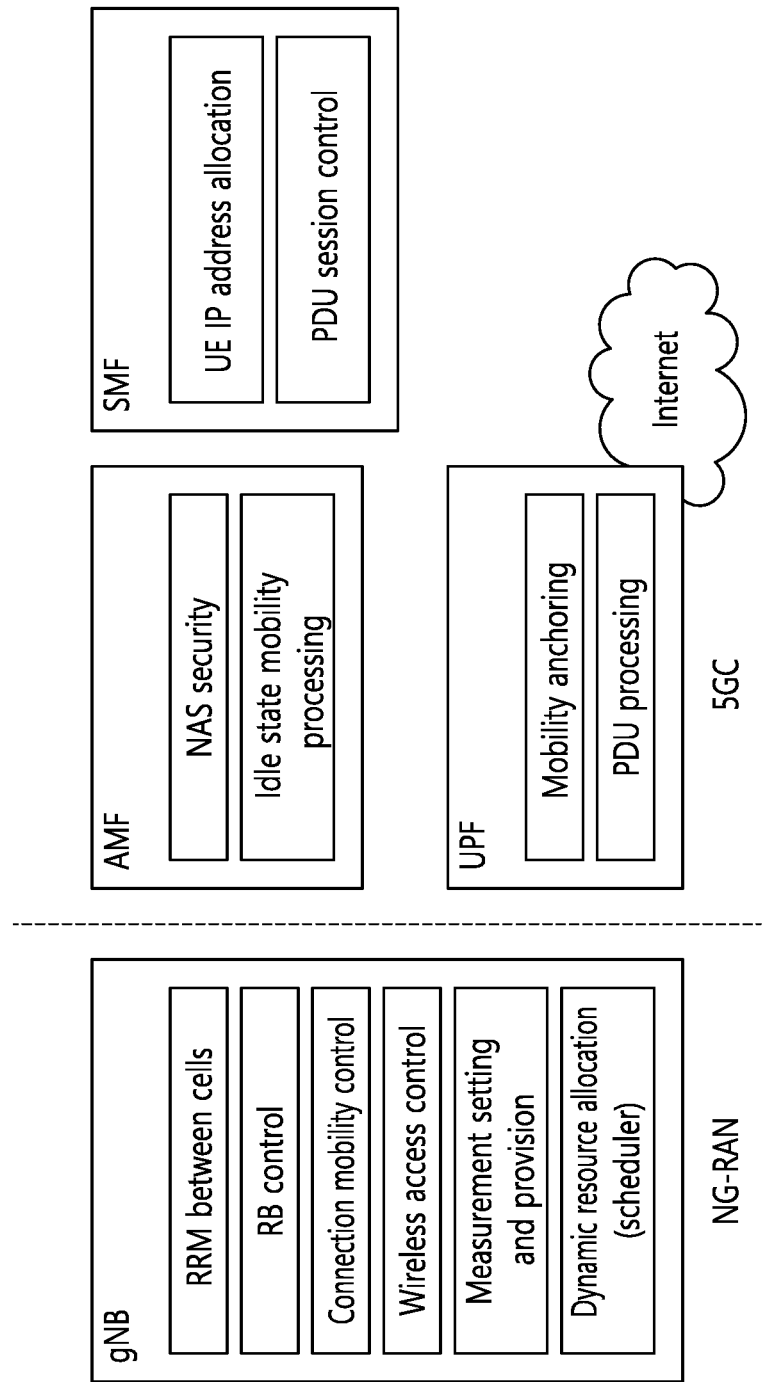
FIG. 5 illustrates functional partitioning between NG-RAN and 5GC.

FIG. 5 illustrates functional partitioning between NG-RAN and 5GC.

Referring to FIG. 5, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

Figure 6:
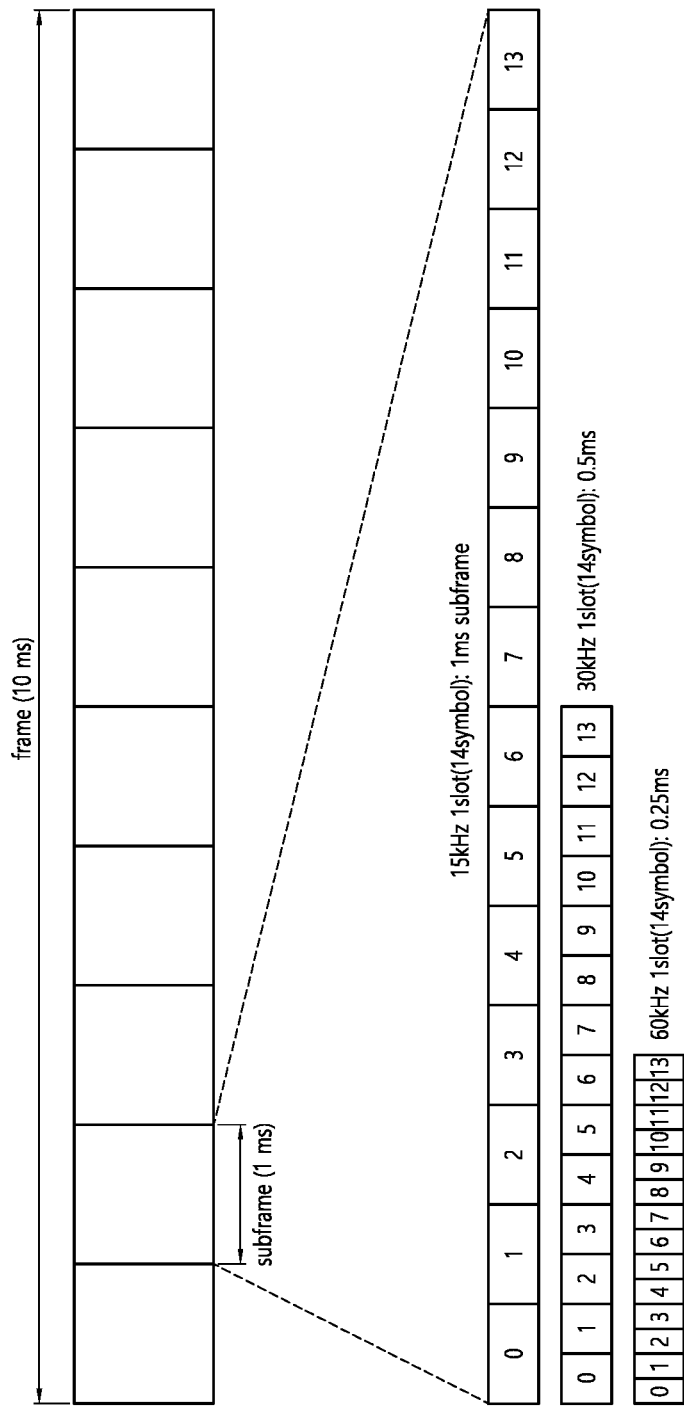
FIG. 6 illustrates a frame structure applicable in NR.

FIG. 6 illustrates a frame structure applicable in NR.

Referring to FIG. 6, a frame may consist of 10 milliseconds (ms) and may include 10 subframes of 1 ms.

A subframe may include one or a plurality of slots according to subcarrier spacing.

Table 1 below shows subcarrier spacing configuration μ.

TABLE 1

| μ | $\Delta f = 2^\mu \cdot 15$ [kHz] | CP(Cyclic Prefix) |
|---|---|---|
| 0 | 15 | Normal |
| 1 | 30 | Normal |
| 2 | 60 | Normal, Extended |
| 3 | 120 | Normal |
| 4 | 240 | Normal |

Table 2 below shows the number of slots in a frame ($N^{frame,\mu}_{symb}$), the number of slots in a subframe ($N^{subframe,\mu}_{slot}$), and the number of symbols in a slot ($N^{slot}_{symb}$) according to the subcarrier spacing configuration μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 6 shows μ=0, 1, and 2.

A physical downlink control channel (PDCCH) may include one or more control channel elements (CCEs) as shown in Table 3 below.

TABLE 3

| Aggregation level | Number of CCEs |
|---|---|
| 1 | 1 |
| 2 | 2 |
| 4 | 4 |
| 8 | 8 |
| 16 | 16 |

In other words, the PDCCH may be transmitted through a resource including 1, 2, 4, 8 or 16 CCEs. Here, the CCE includes six resource element groups (REGs), and one REG includes one resource block in the frequency domain and one orthogonal frequency division multiplexing (OFDM) symbol in the time domain. The following technologies/characteristics may be applied to NR.

<Self-Contained Subframe Structure>

Figure 7:
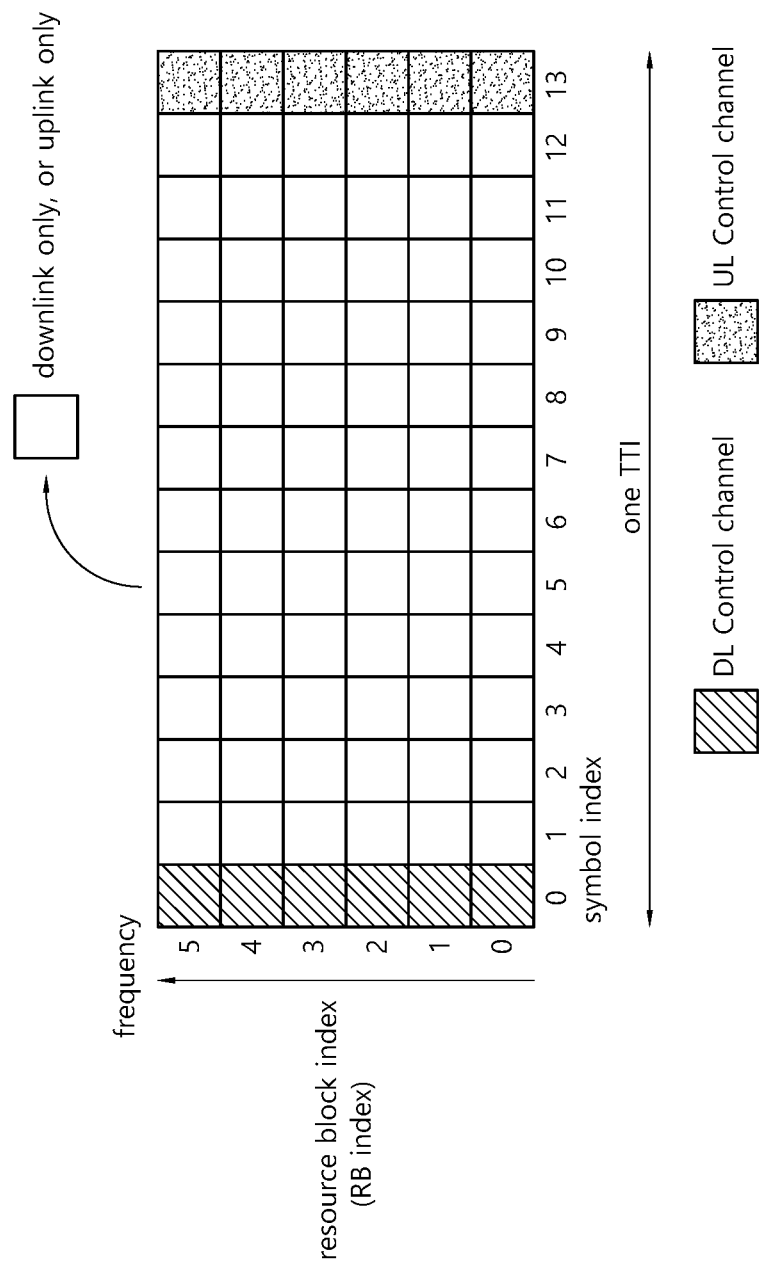
FIG. 7 illustrates an example of a frame structure for the new radio access technology (new RAT).

FIG. 7 illustrates an example of a frame structure for the new radio access technology (new RAT).

In NR, as a purpose for minimizing latency, as shown in FIG. 7, a structure having a control channel and a data channel being processed with Time Division Multiplexing (TDM), within one TTI, may be considered as one type of frame structure.

In FIG. 7, an area marked with slanted lines represents a downlink control area, and an area marked in black represents an uplink control area. An area marked in black may be used for downlink (DL) data transmission or may be used for uplink (UL) data transmission. The characteristic of such structure is that, since downlink (DL) transmission and uplink (UL) transmission are carried out sequentially, DL data is sent out (or transmitted) from a subframe, and UL Acknowledgement/Not-acknowledgement (ACK/NACK) may also be received in the subframe. As a result, time needed until data retransmission, when a data transmission error occurs, may be reduced, and, accordingly, latency in the final data transfer (or delivery) may be minimized.

In the above-described data and control TDMed subframe structure, a time gap is needed for a transition process (or shifting process) from a transmission mode to a reception mode of the base station and UE, or a transition process (or shifting process) from a reception mode to a transmission mode of the base station and UE. For this, in a self-contained subframe structure, some of the OFDM symbols of a time point where a transition from DL to UL occurs may be configured as a guard period (GP).

Figure 8:
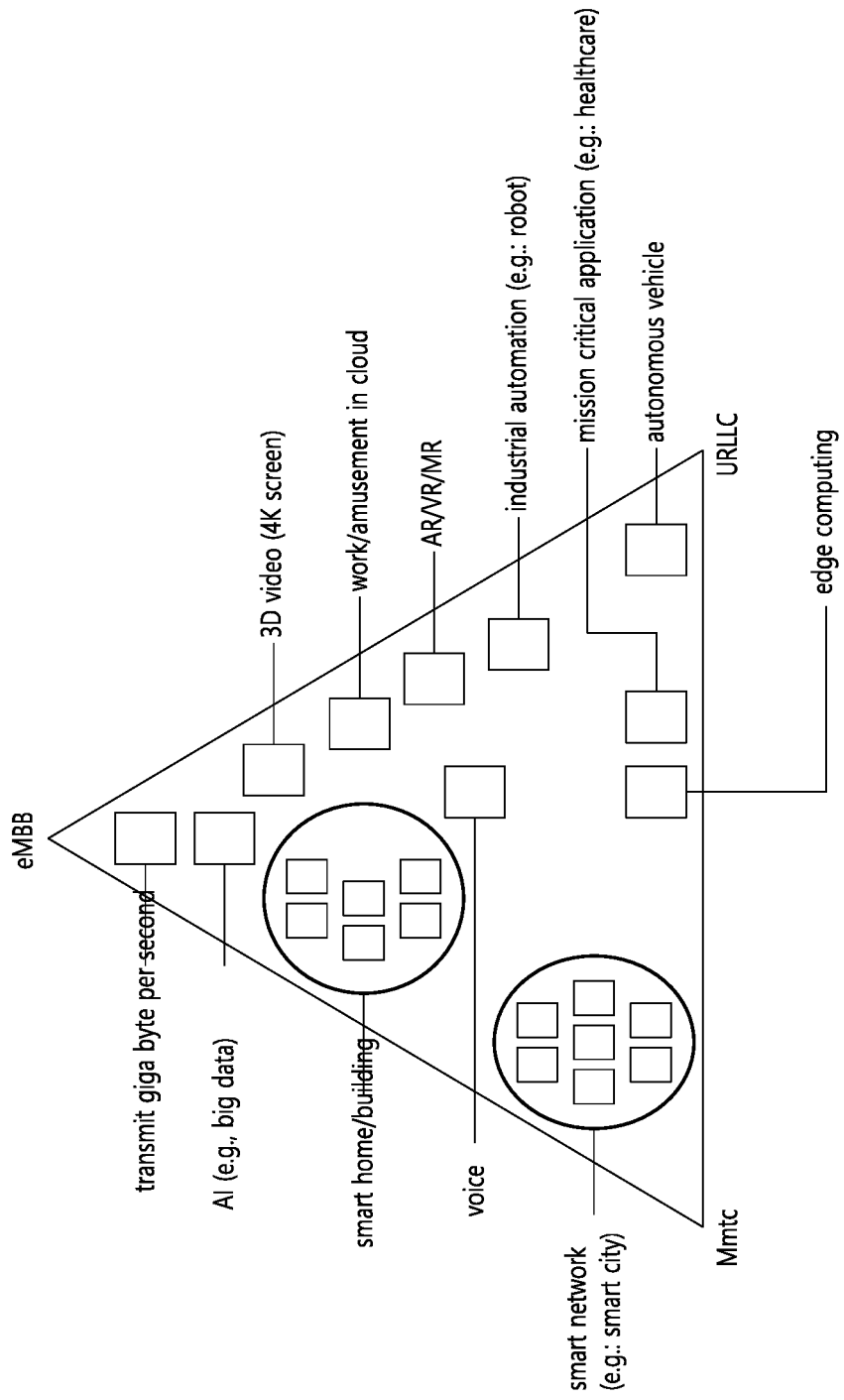
FIG. 8 shows examples of 5G usage scenarios to which the technical features of the present specification can be applied.

FIG. 8 shows examples of 5G usage scenarios to which the technical features of the present specification can be applied. The 5G usage scenarios shown in FIG. 8 are only exemplary, and the technical features of the present specification can be applied to other 5G usage scenarios which are not shown in FIG. 8.

Referring to FIG. 8, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way. eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 8 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

Figure 9:
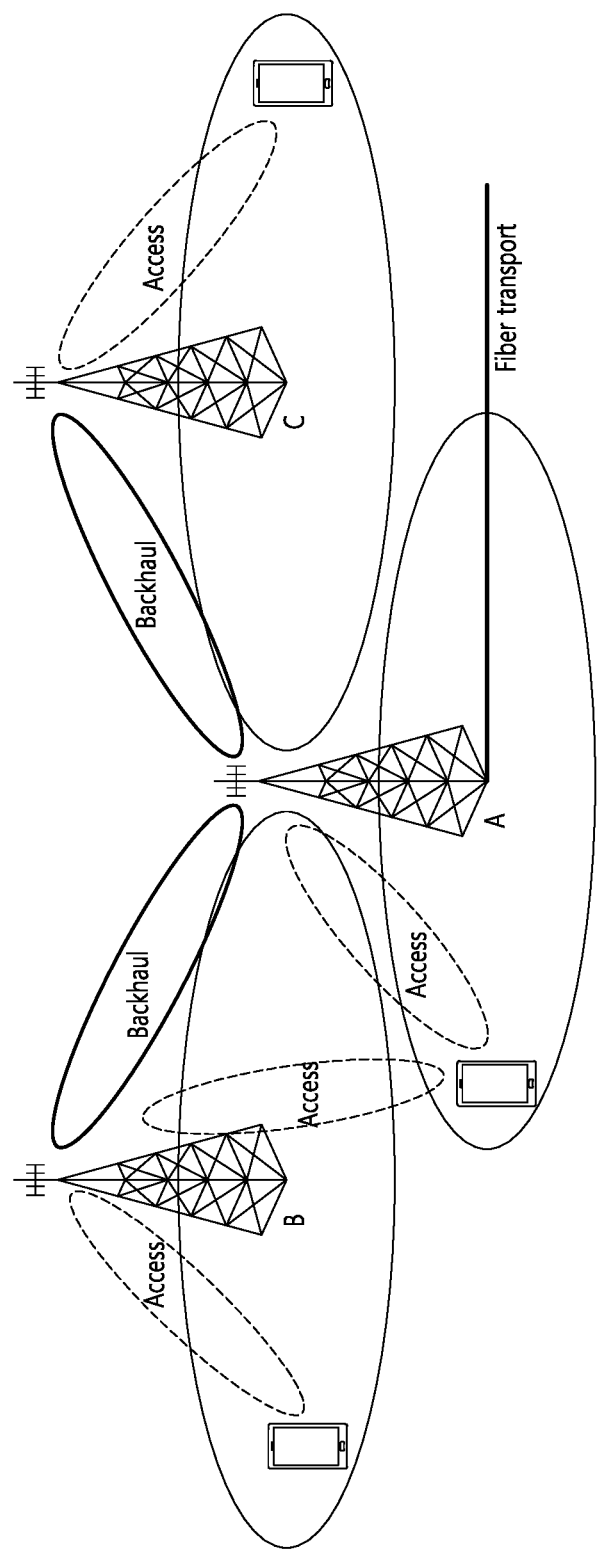
FIG. 9 schematically illustrates an example of integrated access and backhaul links.

FIG. 9 schematically illustrates an example of integrated access and backhaul links.

An example of a network having such integrated access and backhaul links is shown in FIG. 9. Here, a relay node (rTRP) can multiplex access and backhaul links in time, frequency or space (e.g., beam based operation).

Operations of different links may be at the same frequency or different frequencies (which may also be referred to as "in-band" and "out-band" relays). Although efficient support of the out-band relay is important in some NR deployment scenarios, it is very important to understand in-band operation requirements that mean a close interaction with an access link operating at the same frequency in order to accept duplex constraint and prevent/mitigate interference.

In addition, operation of an NR system in mmWave spectrum can present some unique challenges including experiencing serious short-term blocking that may not be easily mitigated by a current RRC based handover mechanism due to a larger time scale necessary to complete a procedure than short-term blocking.

To overcome short-term blocking in the mmWave system, a fast RAN based mechanism (which does not necessarily require intervention of a core network) for switching between rTRPs.

Necessity for mitigating short-term blocking for NR operation in the mmWave spectrum along with requirement for easier deployment of a self-backhauled NR cell may cause necessity of development of an integrated framework that enables rapid switching of access and backhaul links.

In addition, over-the-air (OTA) coordination between rTRPs can be regarded as mitigation of interference and support of end-to-end route selection and optimization.

The following requirements and aspects may need to be solved by integrated access and backhaul (IAB) for NR.

Efficient and flexible operation for in-band and out-band relays in indoor and outdoor scenarios Multiple hops and redundant connection End-to-end route selection and optimization Support of backhaul link with high spectrum efficiency Legacy NR UE support Legacy new RAT was designed to support half-duplex devices. Further, half-duplex of an IAB scenario deserves to be supported and to become an object. In addition, a full-duplex IAB device can be researched.

In the IAB scenario, a donor gNB (DgNB) needs to schedule all links between related relay nodes (RNs) and UEs unless each RN has scheduling capability. In other words, the DgNB can collect traffic information in all related RNs, determine schedules with respect to all links and then notify each RN of schedule information.

Figure 10:
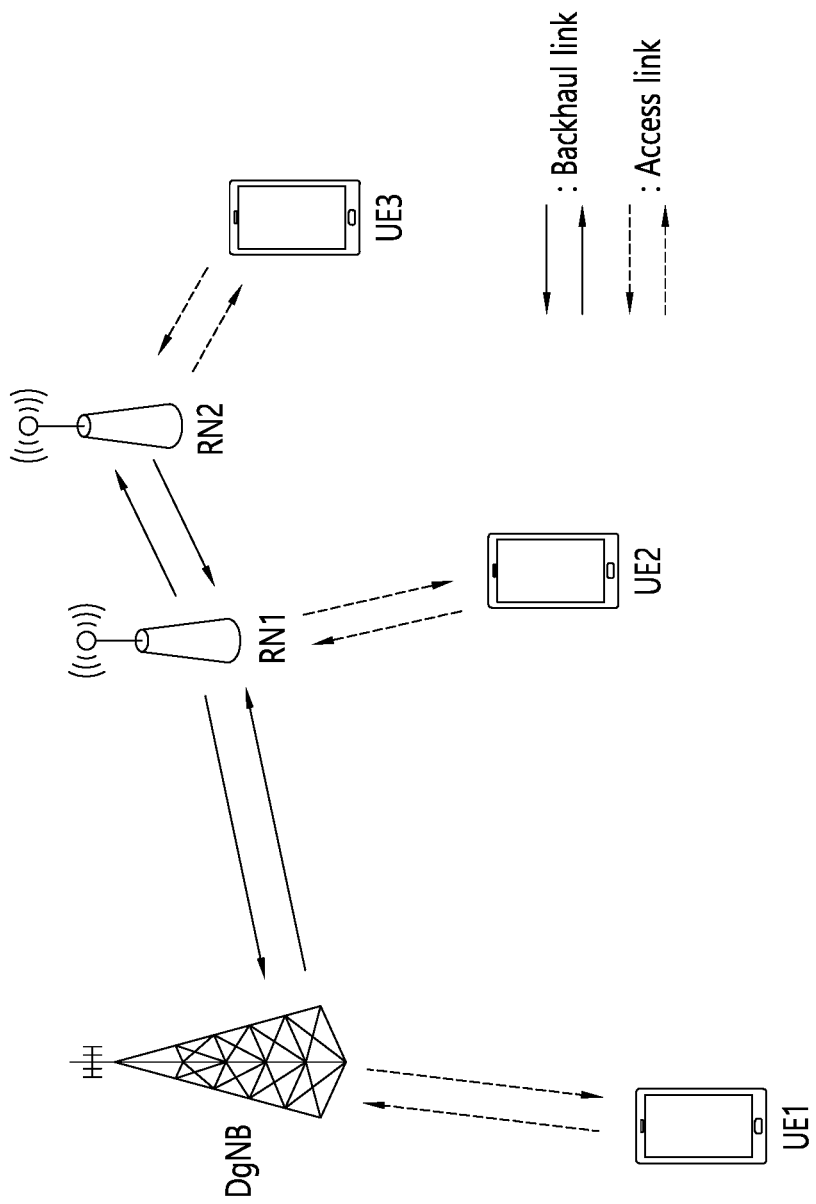
FIG. 10 schematically illustrates an example of a link between a DgNB, an RN, and a UE.

FIG. 10 schematically illustrates an example of a link between a DgNB, an RN, and a UE.

According to FIG. 10, for example, a link between DgNB and UE1 is an access link (access link), a link between RN1 and UE2 is also an access link, and a link between RN2 and UE3 may also mean an access link.

Similarly, according to FIG. 10, for example, a link between DgNB and RN1 and a link between RN1 and RN2 may mean a backhaul link.

For example, backhaul and access links can be configured, and in this case, the DgNB can receive scheduling requests of UE2 and UE3 as well as a scheduling request of UE1. Then, the DgNB can determine scheduling of two backhaul links and three access links and signal the scheduling result. Accordingly, this centralized scheduling includes delayed scheduling and waiting time problems.

On the other hand, distributed scheduling can be performed if each RN has scheduling capability. Then, immediate scheduling can be performed for an uplink scheduling request of a UE and backhaul/access links can be used more flexibly in response to surrounding traffic conditions.

Figure 11:
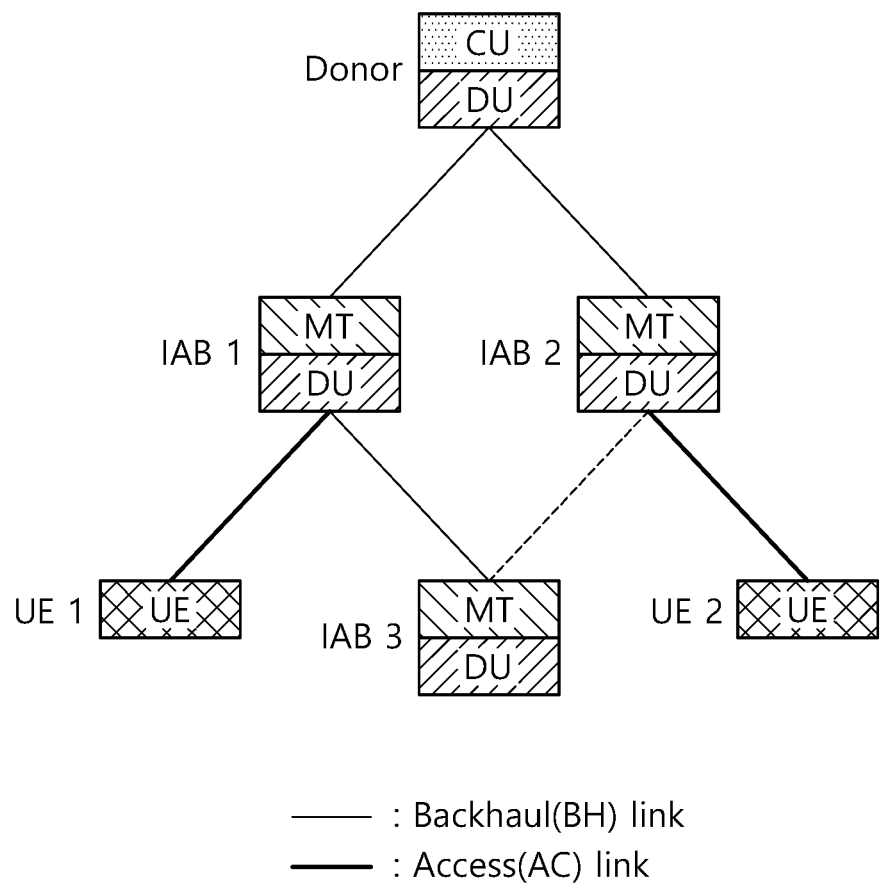
FIG. 11 schematically shows an example of a backhaul link and an access link.

FIG. 11 schematically shows an example of a backhaul link and an access link.

As shown in FIG. 11, a link between a donor node and an IAB node or a link between IAB nodes is called a backhaul link. On the other hand, the link between the donor node and the UE or the link between the IAB node and the UE is called an access link. That is, a link between an MT and a parent DU or a link between a DU and a child MT may be referred to as a backhaul link, and a link between the DU and the UE may be referred to as an access link.

Figure 12:
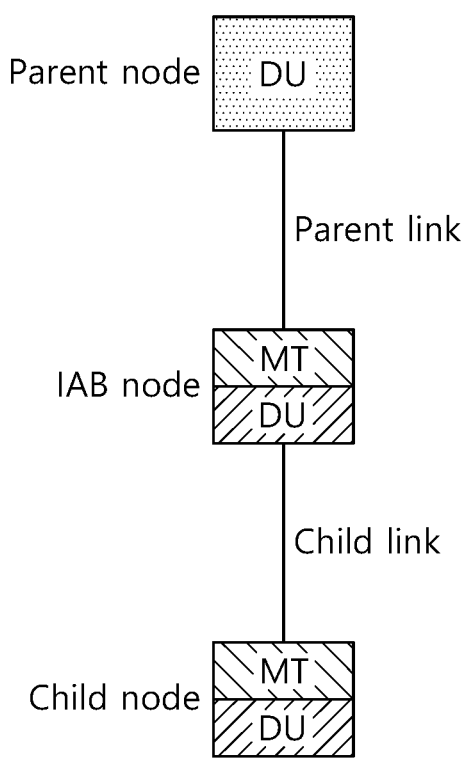
FIG. 12 schematically shows an example of a parent link and a child link.

FIG. 12 schematically shows an example of a parent link and a child link.

As shown in FIG. 12, the link between the IAB node and the parent node is called a parent link, and the link between the IAB node and the child node/UE is called a child link. That is, the link between the MT and the parent DU is called a parent link, and the link between the DU and the child MT/UE is called a child link.

However, depending on the interpretation or perspective, the link between the IAB node and the parent node is called a backhaul link, and the link between the IAB node and the child node/UE is also called an access link.

Based on such a discussion, the MT configuration method for the IAB node considered in the present specification will be described below.

Hereinafter, the proposal of the present specification will be described.

The IAB node receives an MT configuration that informs the link direction information on the parent link between the parent node and itself for communication with the parent node. In addition, the IAB node receives a DU setting that informs the link direction and link availability information for the child link between the child node/access UE and itself for communication with the child node. At this time, in order to support smooth multiplexing such as TDM/SDM/FDM, the IAB node must align DL Tx timing, UL Rx timing, or UL Tx timing with a parent node or child node, in the present specification, a method for effectively aligning them is proposed.

Additional advantages, objects, and features of this specification will be set forth in part in the description that follows, and will become apparent to those skilled in the art upon reviewing the following, or may be learned, in part, from practice of the specification. The objects and other advantages of the present specification may be realized and attained by means of the appended drawings as well as the appended claims and the structures particularly pointed out in the claims.

The configuration, operation, and other features of the present specification may be understood by the embodiments of the present specification described with reference to the accompanying drawings.

The content of the present specification is described assuming an in-band environment, but may also be applied in an out-band environment. In addition, the content of the present specification is described in consideration of an environment in which a donor gNB (DgNB), a relay node (RN), and a UE perform a half-duplex operation, and it can also be applied in an environment in which the donor gNB (DgNB), the relay node (RN), and/or the UE perform full-duplex operation.

In this specification, for convenience of description, when RN1 and RN2 exist, when RN1 is connected to RN2 by a backhaul link and relays data transmitted and received to RN2, RN1 is referred to as a parent node of RN2, and RN2 is referred to as a child node RN of RN1. The terms used in this specification may be as follows.

IAB node (IAB-node): a RAN node that supports radio access to the terminal(s) and supports wireless backhaul of access traffic.

IAB donor (IAB-donor): a RAN node that provides the UE's interface to the core network and wireless backhaul function to the IAB node(s).

Hereinafter, each abbreviation may correspond to an abbreviation of the following terms.

IAB: Integrated Access and Backhaul
CSI-RS: Channel State Information Reference Signal
DgNB: Donor gNB
AC: Access
BH: Backhaul
DU: Distributed Unit
MT: Mobile terminal
CU: Centralized Unit
IAB-MT: IAB mobile terminal
NGC: Next-Generation Core network
SA: Stand-alone
NSA: non-stand-alone
EPC: Evolved Packet Core On the other hand, from the IAB node MT point of view, the time domain resource (s) of the following type (s) may be indicated for the parent link.

downlink time resource;
uplink time resource;
Flexible time resources.

From an IAB node DU perspective, a child link may have time domain resource(s) of the following type(s).

downlink time resource;
uplink time resource;
flexible time resources;
Unavailable time resource(s) (resource(s) not used for communication on DU child link(s)).

The downlink, uplink, and flexible time resource type(s) of the DU child link may belong to one of the following two categories.

Hard: this time resource is always available for DU child links;
Soft: The availability of the corresponding time resource for the DU child link may be explicitly and/or implicitly controlled by the parent node.
Unavailable time resource(s) (resource(s) not available for communication on DU child link(s))

From the point of view of the IAB node DU, the child link has time resources of the downlink (DL), uplink (UL), and flexible (F) types.

Each of the downlink, uplink and flexible time resources of the DU child link may be hard, soft or NA resources. Here, the unavailable (NA) resource may mean that the resource is not used for communication on the DU child link(s). As described above, hard resources may mean that communication is always possible in the DU child link. However, in the case of soft resources, communication availability in the DU child link may be explicitly and/or implicitly controlled by the parent node.

In such a situation, the configuration on link (resource) direction (DL/UL/F) of time resource for DU child link and link (resource) availability (hard/soft/NA) can be named 'DU configuration'.

This configuration can be used for effective multiplexing and interference processing among IAB node(s). For example, this configuration can be used to indicate which link is valid for the time resource between parent link and child link.

In addition, since configuring only a subset of the child node(s) can utilize time resources for DU operation, it can be used to adjust interference among the child node(s).

Considering this aspect, the DU configuration may be more effective when the DU configuration is semi-static and can be configured specifically for the IAB node.

The availability of soft resources can be dynamically configured through L1-based implicit/explicit signaling. "IA" means that the DU resource is explicitly or implicitly marked as available, and "INA" means that the DU resource is explicitly or implicitly marked as unavailable. Dynamic L1-based signaling may indicate whether the DU soft resource is "IA" or "INA".

On the other hand, similar to the SFI configuration for the access link, the IAB node MT may have three types of time resources for the parent link: downlink (DL), uplink (UL), and flexible (F).

Figure 13:
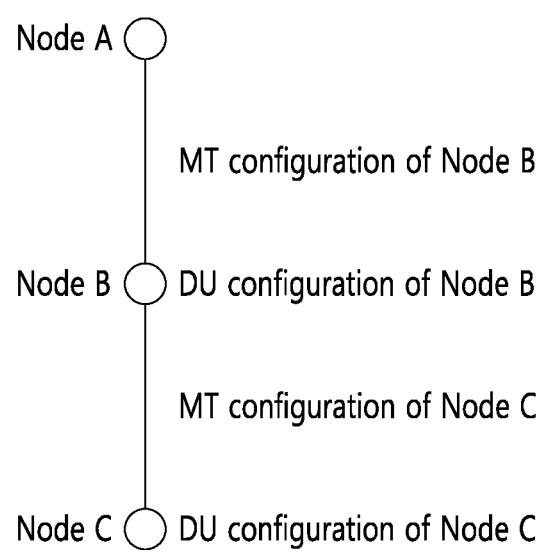
FIG. 13 schematically shows the configuration between nodes.

FIG. 13 schematically shows the configuration between nodes. As in ① of FIG. 13, the IAB node receives an MT setting that informs the link direction information on the parent link between the parent node and itself for communication with the parent node. In addition, as shown in ② of FIG. 13, the IAB node receives the DU setting that informs link direction and link use validity information that can be used for communication with its own child link.

DU and MT existing in the same IAB node (or co-located) cannot operate at the same time due to intra-node interference, slot/symbol boundary misalignment, power sharing, etc., and may operate in TDM.

On the other hand, multiplexing of SDM/FDM may be used between the DU and the MT. This is applicable, for example, when the DU and the MT use different panels and there is little interference between the panels. In this case, DU and MT existing in the same IAB node (or co-located) can transmit or receive at the same time, it is impossible for the DU and the MT to transmit and receive, respectively, or to simultaneously perform reception and transmission.

Alternatively, FD (Full duplexing) may be used between the DU and the MT. This is applicable when, for example, there is little interference between the DU and the MT, such as when the frequency domain in which the DU operates and the frequency domain in which the MT operates are far apart. In this case, the DU and the MT that exist in the same IAB node (or are co-located) can freely transmit and receive at the same time. DU and MT DU and MT can transmit or receive at the same time, it is also possible for the DU and the MT to simultaneously perform transmission and reception or reception and transmission, respectively. Alternatively, if the IAB node has the ability (e.g., self-interference cancellation) to control self-interference (interference caused by the transmitted signal to its received signal), it may operate as an FD.

In this specification, when operating in such SDM/FDM/FD, when Case 6 and 7 are considered in addition to Case 1 timing used in the existing Rel-16 IAB, a timing alignment method will be described.

The Tx/Rx timing alignment method of the IAB node that can be considered in the IAB environment may be as follows. In this specification, timing alignment may mean slot-level alignment or symbol-level alignment.

Figure 14:
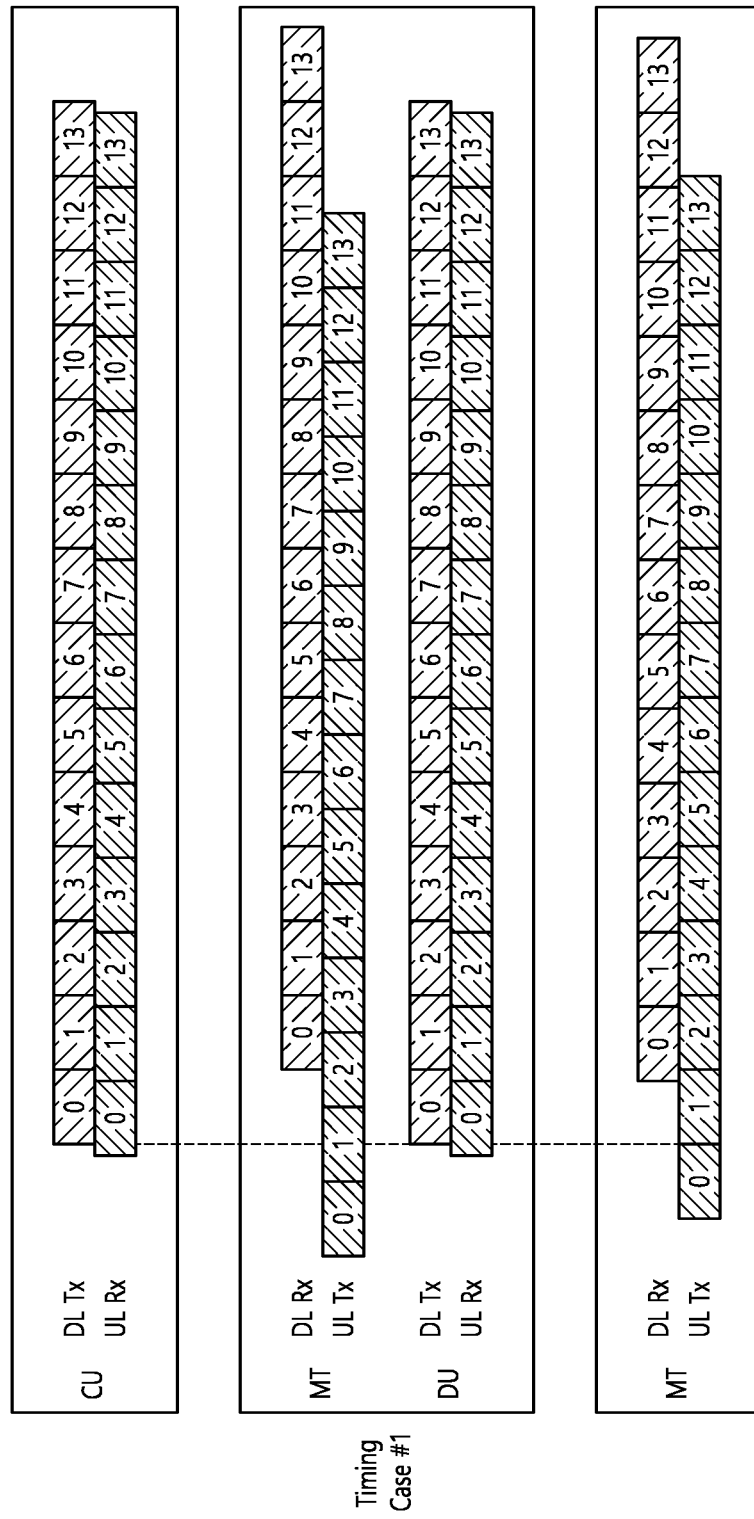
FIG. 14 schematically shows an example of timing alignment case 1.

FIG. 14 schematically shows an example of timing alignment case 1.

Timing Alignment Case 1

DL transmission timing alignment across IAB-node(s) and IAB-donor(s). This is a method in which the DL Tx timing of DUs between IAB nodes is aligned, and is a timing alignment method used by Rel-16 IAB nodes.

If DL TX and UL RX are not well aligned at the parent node, additional information about the alignment is needed for the child node to properly set its DL TX timing for OTA based timing & synchronization.

Figure 15:
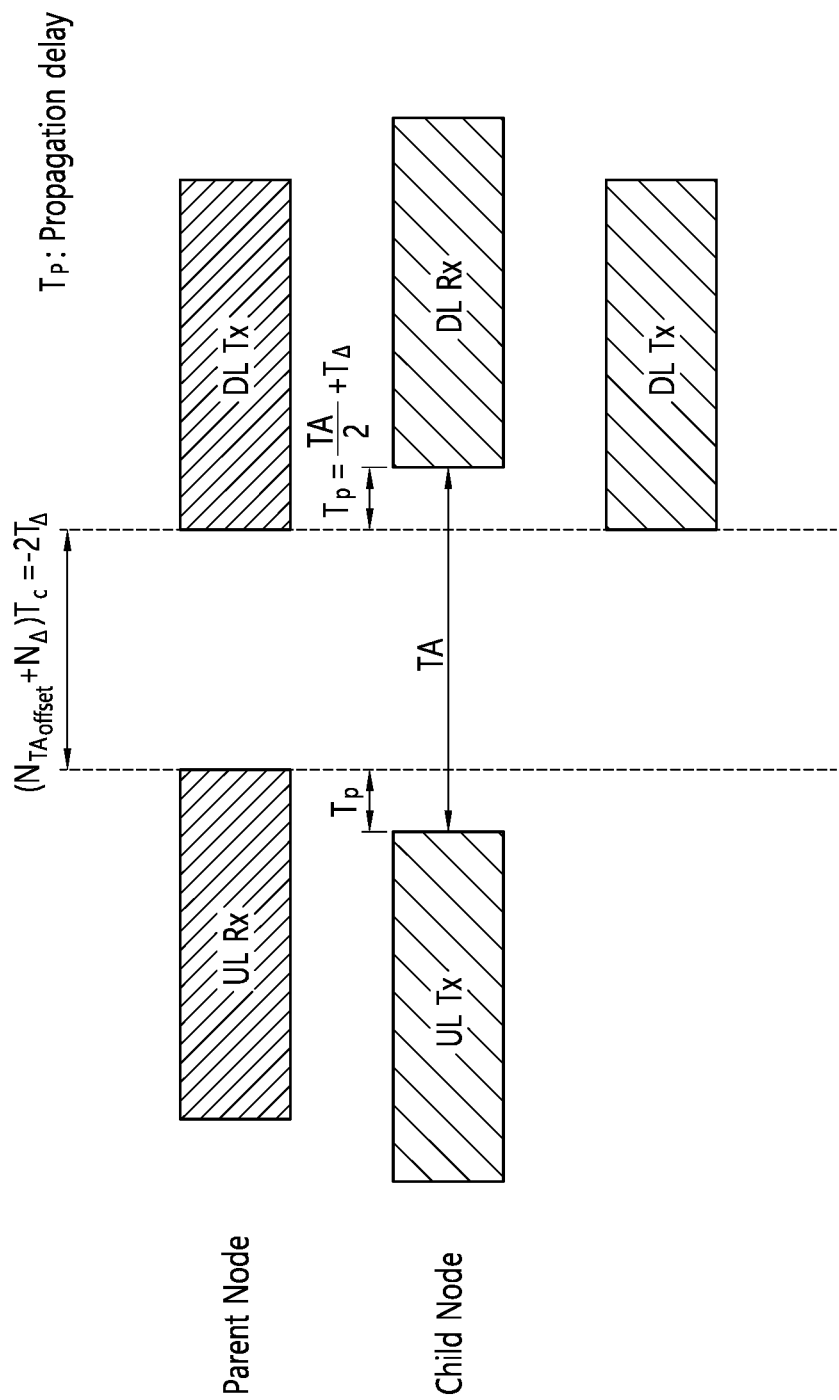
FIG. 15 illustrates an example of timing alignment case 1 in another form.

FIG. 15 illustrates an example of timing alignment case 1 in another form.

The MT Tx timing may be expressed as MT Rx timing−TA, and the DU Tx timing may be expressed as MT Rx timing−TA/2−T_delta. The T_delta value is a value signaled from the parent node. An example of the above operation may be as shown in FIG. 15.

Figure 16:
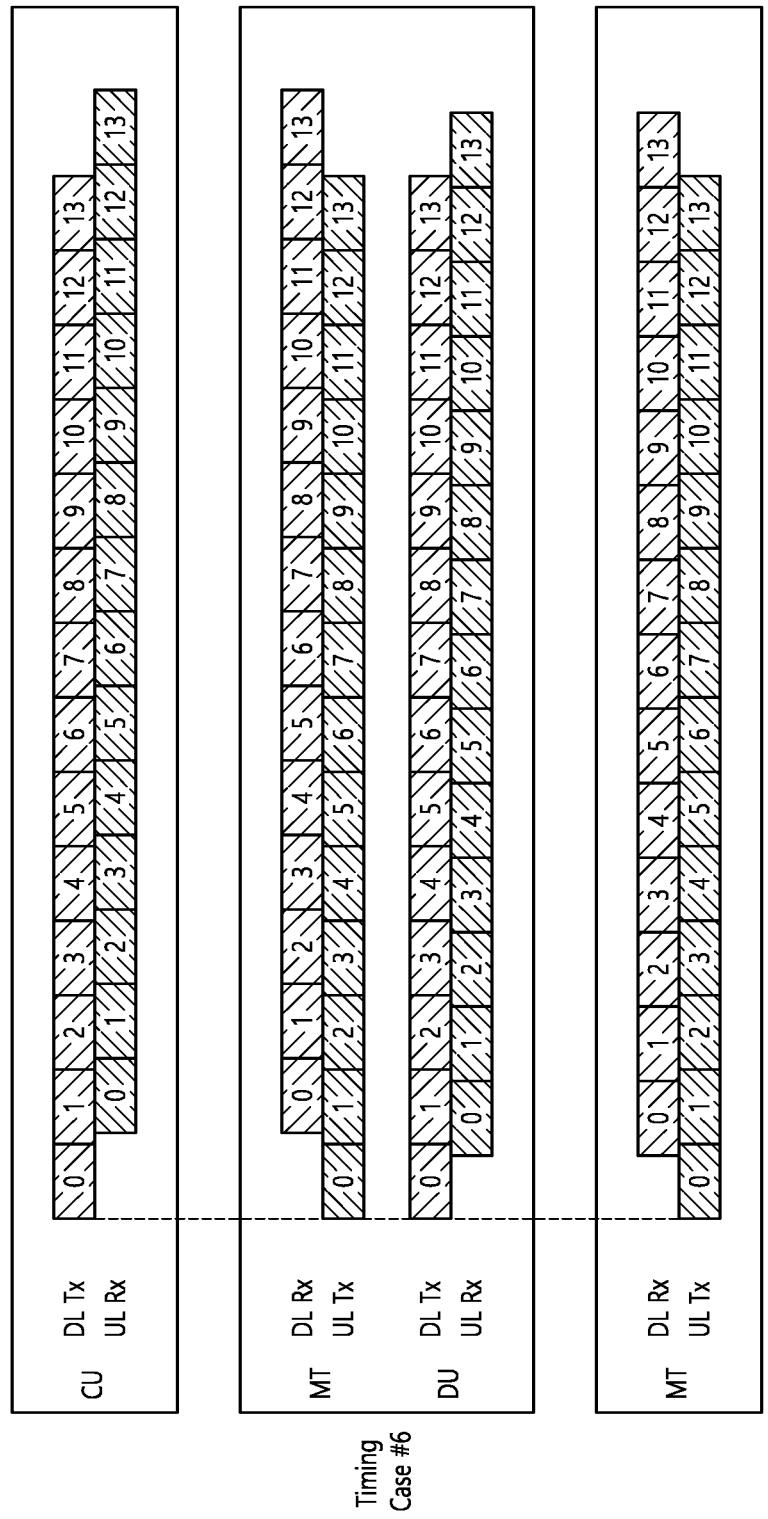
FIG. 16 schematically shows an example of timing alignment case 6.

FIG. 16 schematically shows an example of timing alignment case 6.

Timing Alignment Case 6

The DL transmission timing for all IAB-nodes is aligned with the parent IAB-node or donor DL timing. The UL transmission timing of an IAB-node can be aligned with the IAB-node's DL transmission timing.

Figure 17:
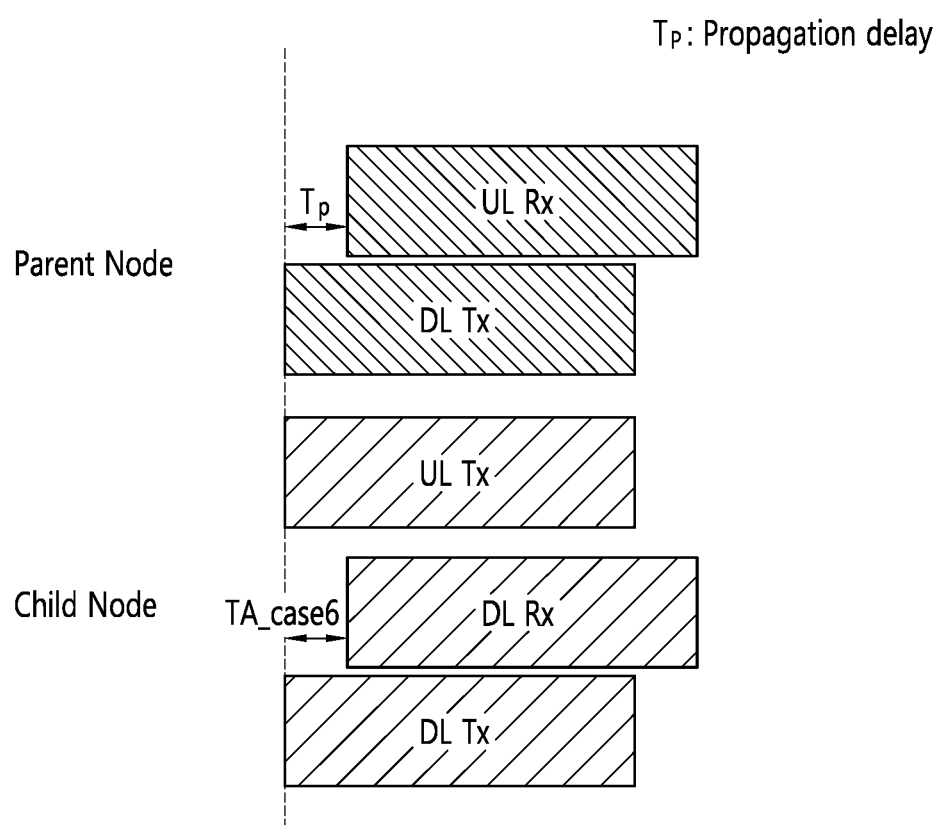
FIG. 17 illustrates an example of the timing alignment case 6 in another form.

FIG. 17 illustrates an example of the timing alignment case 6 in another form.

As illustrated in FIG. 17, case 6 time alignment is a method in which the MT UL Tx timing of the IAB node and the DU DL Tx timing are aligned.

Since the UL Tx timing of the MT is fixed, the UL Rx timing of the parent DU receiving it is delayed by the propagation delay of the parent DU and the MT compared to the UL Tx timing of the MT. The UL Rx timing of the MT varies according to the child MT that transmits the UL. When the IAB node uses the timing alignment case 6, since the UL Rx timing of the parent node is different from the existing one, if the IAB node wants to use the timing alignment case 6, the parent node also needs to know the corresponding information.

Since the UL Tx timing of the MT is aligned, the UL Rx timing of the parent DU receiving it is delayed by a propagation delay between the parent DU and the MT compared to the UL Tx timing of the MT.

Hereinafter, for a better understanding of the examples of the present specification, the disclosure of the present specification will be described with reference to the drawings. The following drawings were created to explain a specific example of the present specification. The names of specific devices described in the drawings or the names of specific signals/messages/fields are presented by way of example, so that the technical features of the present specification are not limited to the specific names used in the following drawings.

Figure 18:
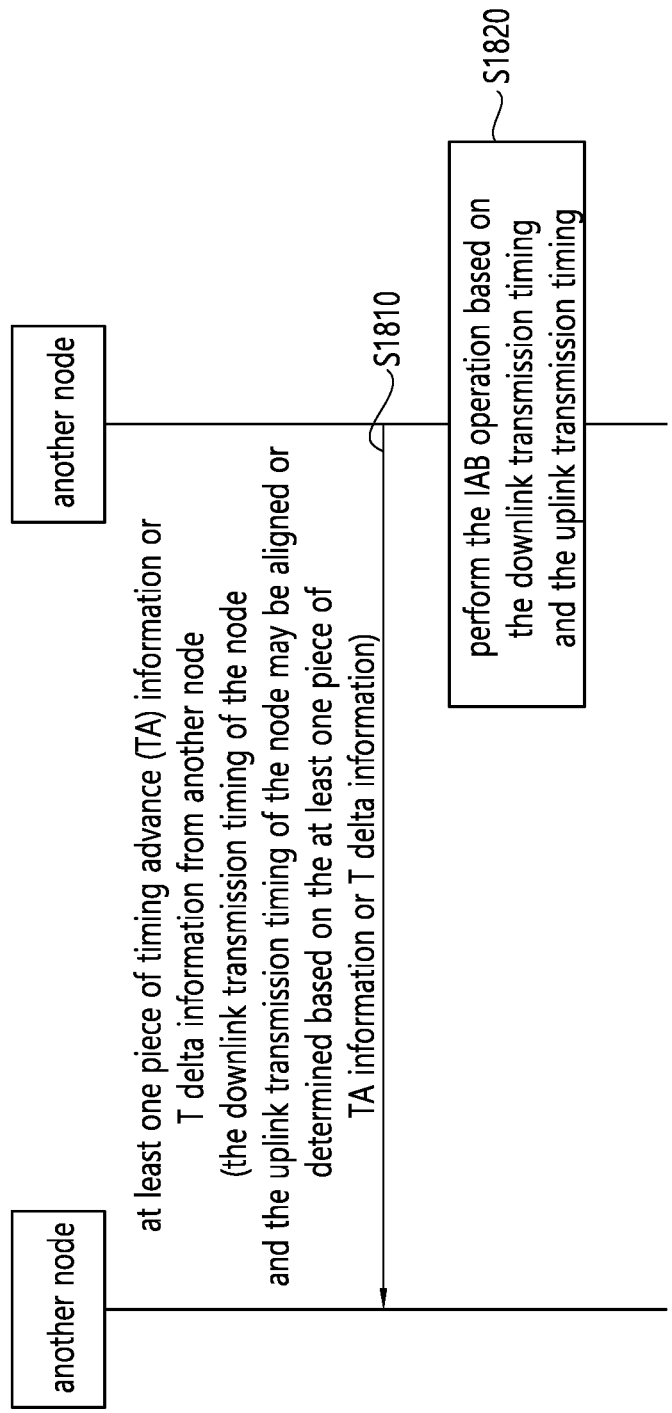
FIG. 18 is a flowchart of a method of performing an Integrated Access and Backhaul (IAB) operation according to an embodiment of the present specification.

FIG. 18 is a flowchart of a method of performing an Integrated Access and Backhaul (IAB) operation according to an embodiment of the present specification.

The node may receive at least one piece of timing advance (TA) information or T delta information from another node (S1810). Here, the node may mean an IAB node. In this regard, a more specific embodiment is the same as described above (and will be described later), so for convenience of description, repeated description of overlapping content will be omitted.

Here, the downlink transmission timing of the node and the uplink transmission timing of the node may be aligned or determined based on the at least one piece of TA information or T delta information. In this regard, a more specific embodiment is the same as described above (and will be described later), so for convenience of description, repeated description of overlapping content will be omitted.

In other words, the node may adjust the downlink transmission timing of the node and the uplink transmission timing of the node to be aligned or determined based on the at least one piece of TA information or T delta information. In this regard, a more specific embodiment is the same as described above (and will be described later), so for convenience of description, repeated description of overlapping content will be omitted.

The node may perform the IAB operation based on the downlink transmission timing and the uplink transmission timing (S1820). In this regard, a more specific embodiment is the same as described above (and will be described later), so for convenience of description, repeated description of overlapping content will be omitted.

For example, the other node may be a parent node or a Centralized Unit (CU). In this regard, a more specific embodiment is the same as described above (and will be described later), so for convenience of description, repeated description of overlapping content will be omitted.

For example, the IAB operation includes a mobile terminal (MT) operation and a distributed unit (DU) operation, the MT operation is an operation related to communication between the node and the parent node, and the DU operation may be an operation related to communication between the node and a child node or communication between the node and a terminal. In this regard, a more specific embodiment is the same as described above (and will be described later), so for convenience of description, repeated description of overlapping content will be omitted.

For example, the node aligns the downlink transmission timing and the uplink transmission timing based on the timing alignment case 6, in the timing alignment case 6, the downlink transmission timing of the DU operation between the node and the parent node may be aligned, and the uplink transmission timing of the MT operation of the node and the downlink transmission timing of the DU operation may be aligned. In this regard, a more specific embodiment is the same as described above (and will be described later), so for convenience of description, repeated description of overlapping content will be omitted.

For example, the uplink transmission timing may be aligned based on the downlink transmission timing. In this regard, a more specific embodiment is the same as described above (and will be described later), so for convenience of description, repeated description of overlapping content will be omitted.

Here, for example, the node may explicitly or implicitly receive information indicating the use of the timing alignment case 6 from the parent node or the CU. Here, for example, the node may receive specific TA information for the timing alignment case 6 from the parent node or the CU. Here, for example, when the node receives the specific TA information, use of the timing alignment case 6 by the node may be triggered. Here, for example, when the node receives the specific TA information from the CU, the node may transmit a propagation delay value between the node and the parent node to the CU. In this regard, a more specific embodiment is the same as described above (and will be described later), so for convenience of description, repeated description of overlapping content will be omitted.

For example, the node may calculate specific TA information for the timing alignment case 6 based on an equation including the TA information and the T delta information. In this regard, a more specific embodiment is the same as described above (and will be described later), so for convenience of description, repeated description of overlapping content will be omitted.

For example, the downlink transmission timing may be aligned based on the uplink transmission timing. Here, for example, the node may prioritize the TA information over the T delta to perform timing alignment. In this regard, a more specific embodiment is the same as described above (and will be described later), so for convenience of description, repeated description of overlapping content will be omitted.

For example, the node may independently receive the uplink transmission timing and the downlink transmission timing from the other node. In this regard, a more specific embodiment is the same as described above (and will be described later), so for convenience of description, repeated description of overlapping content will be omitted.

Hereinafter, the embodiments of the present specification will be described in more detail.

When case 6 timing is used, that is, in order to align the DU DL Tx timing and the MT UL Tx timing from the viewpoint of the IAB node, two methods may exist.

1. Align the UL Tx timing with the DL Tx timing.

A. As an embodiment, the DL Tx timing between the IAB nodes may reuse the timing alignment method set/applied in the case 1 timing as it is. That is, the IAB node (child node in FIG. 17) uses the value of T_delta signaled from the parent, the IAB node (child node in FIG. 17) applies/sets the DL Tx timing by advancing by a value of "TA/2+T_delta" from the DL Rx timing. Then, the DL Tx timing between the IAB nodes is aligned. Afterwards (through explicit or implicit signaling), when instructed to operate in SDM/FDM or to use case 6 timing, the UL Tx timing is set/applied as the DL Tx timing, and a transmission signal is transmitted to the parent node/CU.

i. As an example of the above-described explicit signaling, as shown in FIG. 17, TA_case6 may be transmitted from the parent node/CU separately/independently from the existing TA, it may be understood that the signaling triggers Case 6 timing. That is, only when the value is transmitted, it can be considered that the case 6 timing is active/applied. If transmitted from the CU, the IAB node measures the propagation delay (Tp) value between the (connected) parent node and itself, and reports periodically, semi-periodically, or aperiodically to the CU. Here, the value of TA_case6 may be an absolute value that the IAB node will actually apply for timing adjustment, or may be a simple triggering signal for transmitting the UL Tx timing at the DL Tx timing.

ii. In the method A, since two timing controls with different purposes are operated, in terms of parent node or CU, there may be a problem in whether UL signaling is well received (within the CP boundary) when the TA value when operating in case 1 and the TA_case6 value when operating in case 6 are applied. To this end, two independent RACH procedures having different periods/offsets may be considered. That is, two independent RACH resources may be configured/applied for case 1 and case 6 timing alignment.

1. Another way for A-ii is to align the timing for Case 6, by setting/applying a specific RS (e.g., SRS, PRS) set periodically/semi-periodically/aperiodically, a parent node can measure/estimate the propagation delay between a parent node and a child node.

B. The UL Tx timing of a general UE operates by advancing by TA from the DL Rx timing, when case 1 timing is applied, the DL Tx timing is set/applied by advancing the timing calculated as TA/2+T_delta from the DL Rx timing using the TA command and additional T_delta signaling. Here, in order to align with the UL Tx timing, the following equation can be used. It can be interpreted as TA/2+T delta=TA_case6→(assuming TA=TA_case6) TA=2*T_delta. That is, the parent node calculates T_delta and/or TA from one way propagation delay (Tp), and informs the child of T_delta and/or TA, the IAB node may align the case 6 timing by calculating/applying the DL Tx timing and the UL Tx timing according to the above equation. That is, in order to align the DL and UL timings, it is a method of effectively reducing signaling overhead by using a specific equation supported by the existing Rel-16.

i. As shown in the above formula, it may be efficient to represent one representative value. For example, when the IAB node operates in case 6 timing alignment, that is, SDM/FDM (through explicit or implicit signaling), or when case 6 timing is used, it can operate only by signaling of T_delta or signaling of TA. That is, the parent node calculates T_delta and/or TA based on the one-way propagation delay (Tp), and informs the child only T_delta or TA, the UE calculates/applies the DL timing and the UL timing by applying 2*T_delta or TA using the received values for the DL Tx timing and the UL Tx timing. In the above method, when a valid TA command is not received within a specific window range at the time when T_delta is received, the IAB node may determine the case 6 timing and perform case 6 timing alignment.

ii. In another embodiment, only when TA and T_delta are signaled with a separate field like case 1 timing and operating with SDM/FDM (via explicit or implicit signaling) or using Case 6 timing, calculating/applying DL timing and UL timing using the T_delta value, and TA values may not be used for Case 6 timing alignment. In other words, the values of TA and T_delta are calculated by the case 1 timing method, when the IAB node operates with case 6 timing, only T_delta is used to match case 6 timing, in this case, TA and T_delta may not satisfy the linear relationship of TA=2*T_delta.

iii. In another embodiment, by newly defining a field (e.g., T_delta_case6) used for case 6 timing alignment, or by receiving a signal with a separate flag indicating case 6 timing, in this case, timing alignment is performed by advancing the DL Tx timing and the UL Tx timing by 2*T_delta_case6 from the DL Rx timing according to the case 6 timing method. That is, a single separate signaling is defined for the case 6 timing, and whenever the corresponding signaling is received, the case 6 timing is updated. Alternatively, in this case, timing alignment is performed by advancing the DL Tx timing and the UL Tx timing from the DL Rx timing by T_delta_case6.

C. In the case of the above method (especially when each TA and T_delta are signaled), since TA and T_delta have different granularities, the DL Tx timing and the UL Tx timing may not be perfectly aligned. In this case, a timing alignment technique for aligning UL Tx timing is applied by giving priority to DL Tx timing. Alternatively, when the IAB node is configured to operate explicitly or implicitly with case 6 timing, it expects that the received/applied TA and T_delta values satisfy TA=2*T_delta+Te. Here, Te may be interpreted as a RAN4 requirement for Case 6.

2. Align the DL Tx timing based on the UL Tx timing.

A. When using the above method, the timing method of method 1 can be reused as it is. The difference will be the priority in case the two timings are out of sync. For example, since the granularity of TA and T_delta is different (especially when each TA and T_delta are signaled), when the DL Tx timing and the UL Tx timing are not perfectly aligned, a timing alignment technique for aligning DL Tx timing is applied by giving priority to UL Tx timing. That is, timing alignment is performed by giving priority to TA over T_delta signaling.

i. TA and T_delta are signaled with a separate field like case 1 timing, and only when operating with SDM/FDM (through explicit or implicit signaling), calculating/applying DL timing and UL timing using the TA value, the T_delta value may not be used for case 6 timing alignment. In other words, the values of TA and T_delta are calculated by the case 1 timing method, when the IAB node operates with the case 6 timing, only the TA is used to match the case 6 timing, and the T_delta value is ignored.

ii. In another embodiment, when a field (e.g., TA_case6) used for case 6 timing alignment is newly defined or a signal having a separate flag indicating case 6 timing is received, according to the case 6 timing method, timing alignment is performed by advancing the DL Tx timing and the UL Tx timing from the DL Rx timing by TA_case6. That is, a single separate signaling is defined for the case 6 timing, and whenever the corresponding signaling is received, the case 6 timing is updated.

3. UL Tx timing and DL Tx timing are set independently.

A. The IAB node may independently set the UL Tx timing and the DL Tx timing. In this case, the parent node needs to properly calculate/set the setting value used for timing alignment so that the UL Tx timing and the DL Tx timing of the IAB node are aligned. When using the above method, the UL Tx timing of the MT may use the method of matching the UL Tx timing in method 2. In addition, the DL Tx timing of the DU may use the method of matching the DL TX timing in method 1.

When applying the above timing alignment, since the IAB node has the timing capability, that is, the IAB nodes have a separate GNSS-like timing source, when it has a more accurate timing source than the parent and/or child node, it is possible to decide whether to use technique 1 or technique 2. That is, it is possible to align the UL timing based on the DL timing or vice versa. For example, if the user has a better timing source than the parent, the DL timing may be aligned with the UL timing. To this end, the parent node may inform the child of its own multiplexing information/timing quality information, and the child may also inform the parent of the multiplexing information/timing quality information. If the information is not signaled, a default operation may align the UL Tx timing based on the DU Tx timing. Alternatively, the CU or parent node may set/instruct the IAB node on which timing to perform the case 6 timing.

In the case of the signaling, IAB node-specific (i.e., cell-specific) operation may be performed, alternatively, in the case of MIMO and SDM-based operation operating with multiple beams, a link (beam or panel) may be specifically operated. That is, in this case, signaling is divided for each link.

Figure 19:
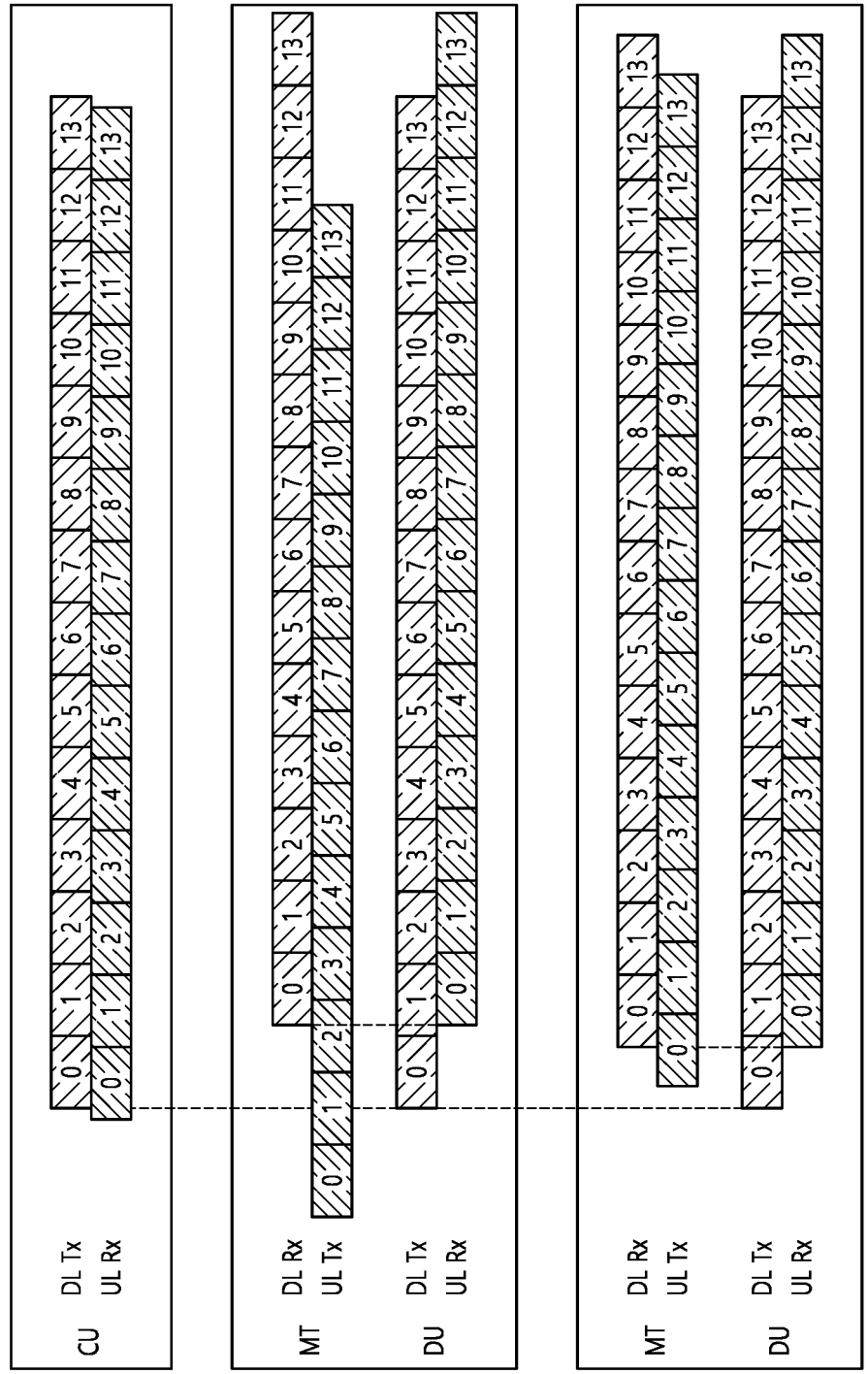
FIG. 19 schematically shows an example of the timing alignment case 7.

FIG. 19 schematically shows an example of the timing alignment case 7.

Timing alignment case 7

The DL transmission timing for all IAB-nodes is aligned with the parent IAB-node or donor DL timing. The UL reception timing of an IAB-node can be aligned with the IAB-node's DL reception timing.

If DL TX and UL RX are not well aligned at the parent node, additional information about the alignment is needed for the child node to properly set its DL TX timing for OTA based timing & synchronization.

Figure 20:
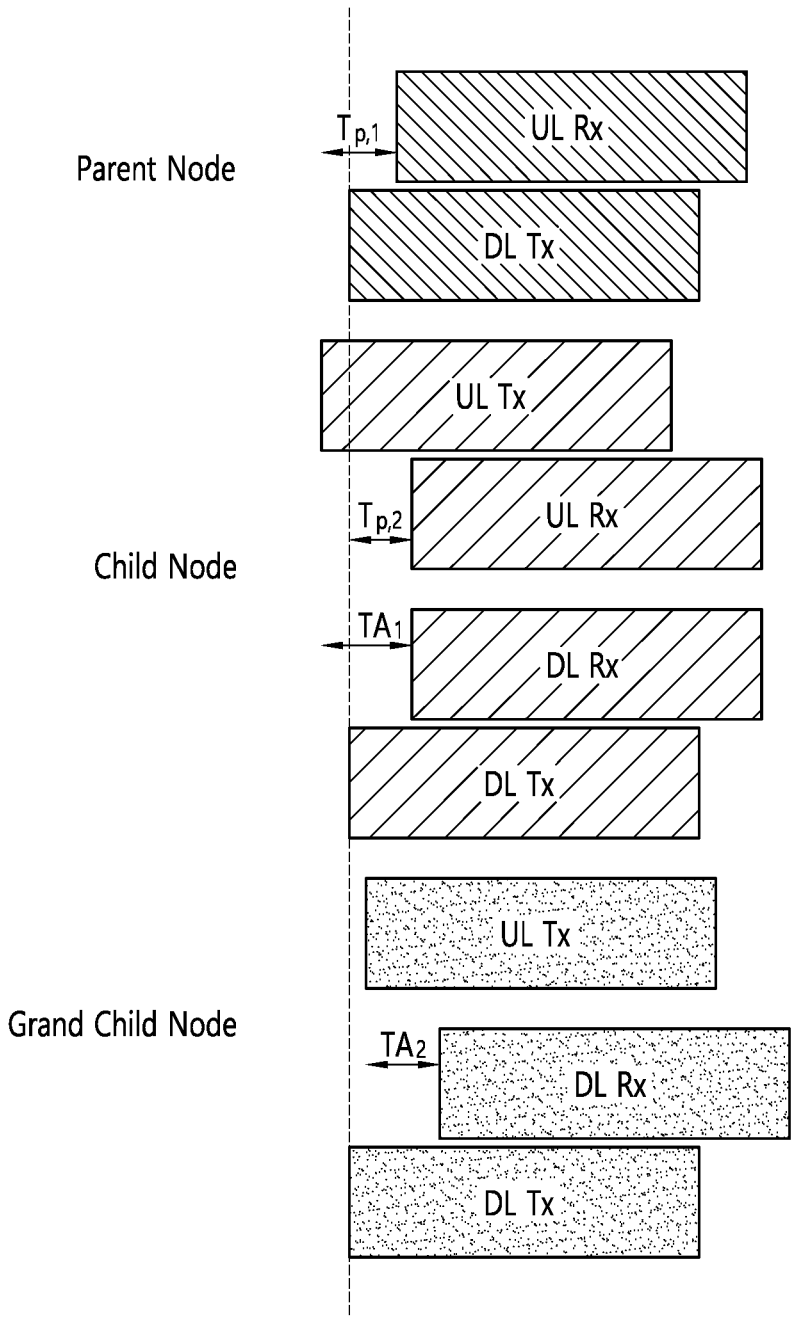
FIG. 20 shows an example of the timing alignment case 7 in another form.

FIG. 20 shows an example of the timing alignment case 7 in another form.

As shown in FIG. 20, the timing alignment case 7 is a method in which the MT DL Rx timing and the DU UL Rx timing of the IAB node are aligned.

The transmission/reception timing from the MT perspective is the same as that of the existing IAB node (Rel-16 IAB node), the UL Rx timing of the DU may be aligned with the DL Rx timing of the MT. The IAB node needs to adjust the TA of the child MTs so that the child MTs transmit UL signals according to their UL Rx timing.

Therefore, this timing alignment method may not reveal a difference in the specification operation of the IAB node compared to the existing timing alignment method (case 1). Accordingly, the timing alignment case 7 described herein may be replaced/interpreted as the timing alignment case 1.

The transmission/reception timing from the MT perspective is the same as that of the existing NR terminal (i.e., same operation as the UE). In order to align its UL Rx timing with DL Rx timing, the IAB node aligns DL Tx timing between IAB nodes using Case 1 timing, using this, the parent node can adjust the TA of the child node to align the DL Rx timing and the UL Rx timing.

Among the above methods, in the case of a method of aligning DL Tx timing using Case 1 timing, as described above, the DL Tx timing is determined by advancing by TA/2+T_delta from the DL Rx timing. When all of the IAB nodes operating in multi-hop as shown in FIG. 20 operate in case 7, it may be rather difficult to set Case 7 that satisfies the DL Tx timing alignment of the IAB nodes and the DL Rx and UL Rx timing alignments in the IAB node at the same time. Since propagation delay between each node and the HW capability of the node may be different, TA and T_delta applied to this may be different for each node, and thus it may be complicated to simultaneously satisfy them. To this end, the parent node may separately signal signaling for DL Tx timing (e.g., TA_Tx) and signaling for satisfying DL Rx timing with UL (e.g., TA_Rx). In the case of the signaling, IAB node-specific (i.e., cell-specific) operation may be performed, alternatively, in the case of MIMO and SDM-based operation operating with multiple beams, a link (beam or panel) may be specifically operated. That is, in this case, signaling is divided for each link.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

Figure 21:
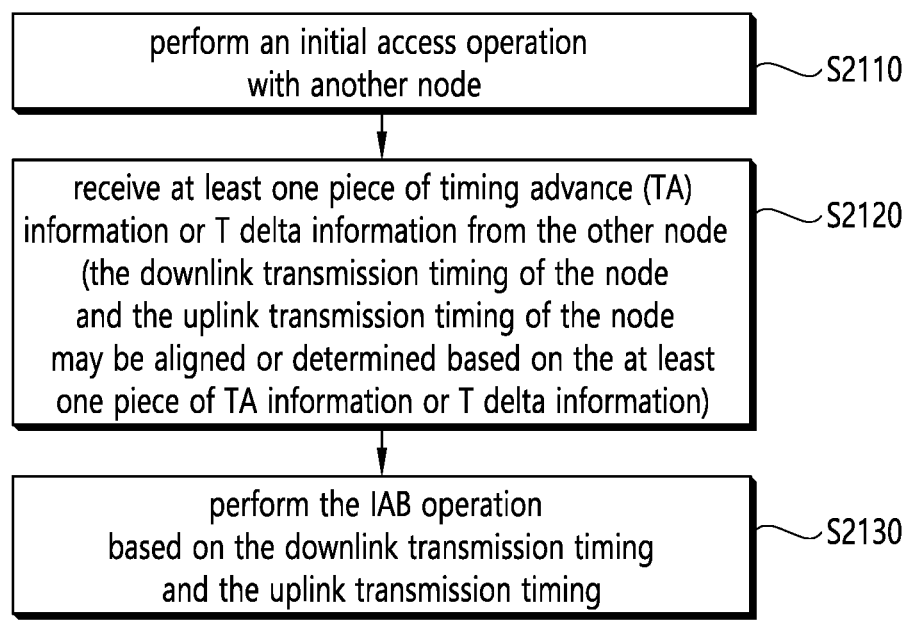
FIG. 21 is a flowchart of a method of performing an Integrated Access and Backhaul (IAB) operation according to another embodiment of the present specification.

FIG. 21 is a flowchart of a method of performing an Integrated Access and Backhaul (IAB) operation according to another embodiment of the present specification.

According to FIG. 21, a node may perform an initial access operation with another node (S2110). In this regard, a more specific embodiment is the same as described above (and will be described later), so for convenience of description, repeated description of overlapping content will be omitted.

The node may receive at least one piece of timing advance (TA) information or T_delta information from the other node (S2120). Here, the downlink transmission timing of the node and the uplink transmission timing of the node may be aligned or determined based on the at least one piece of TA information or T_delta information. In this regard, a more specific embodiment is the same as described above (and will be described later), so for convenience of description, repeated description of overlapping content will be omitted.

The node may perform the IAB operation based on the downlink transmission timing and the uplink transmission timing (S2130). In this regard, a more specific embodiment is the same as described above (and will be described later), so for convenience of description, repeated description of overlapping content will be omitted.

On the other hand, if the contents to which the above-described examples are applied from the viewpoint of various subjects, it may be as follows.

The following drawings were created to explain a specific example of the present specification. The names of specific devices described in the drawings or the names of specific signals/messages/fields are presented by way of example, so that the technical features of the present specification are not limited to the specific names used in the following drawings.

Figure 22:
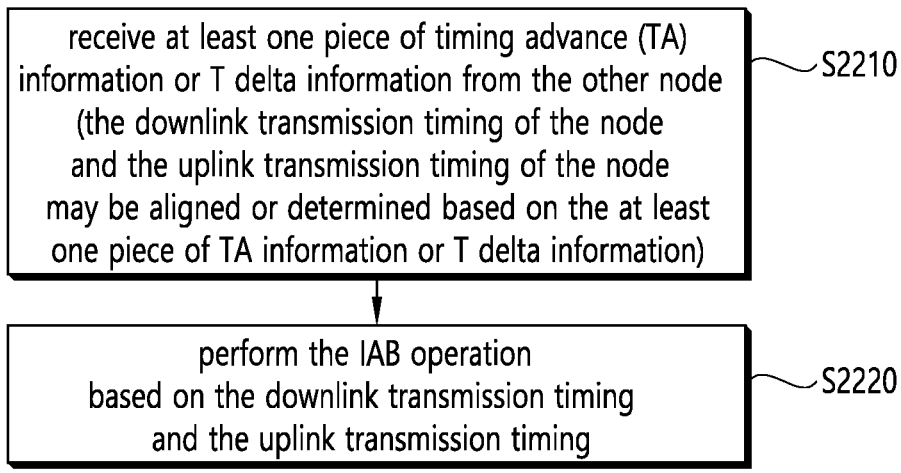
FIG. 22 is a flowchart of a method of performing an Integrated Access and Backhaul (IAB) operation (from a node perspective) according to an embodiment of the present specification.

FIG. 22 is a flowchart of a method of performing an Integrated Access and Backhaul (IAB) operation (from a node perspective) according to an embodiment of the present specification.

According to FIG. 22, a node may receive at least one piece of timing advance (TA) information or T delta information from another node (S2210). Here, the downlink transmission timing of the node and the uplink transmission timing of the node may be aligned or determined based on the at least one piece of TA information or T delta information. In this regard, a more specific embodiment is the same as described above (and will be described later), so for convenience of description, repeated description of overlapping content will be omitted.

The node may perform the IAB operation based on the downlink transmission timing and the uplink transmission timing (S2220). In this regard, a more specific embodiment is the same as described above (and will be described later), so for convenience of description, repeated description of overlapping content will be omitted.

Figure 23:
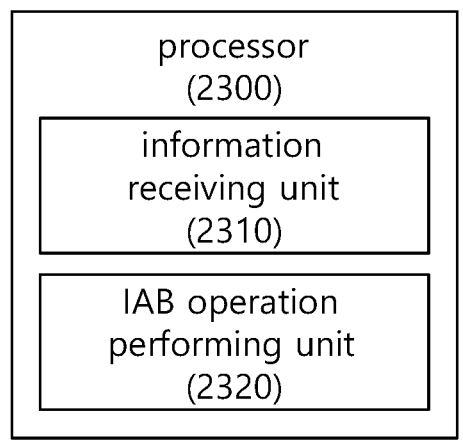
FIG. 23 is a block diagram of an example of an apparatus for performing an Integrated Access and Backhaul (IAB) operation (from a node perspective) according to an embodiment of the present specification.

FIG. 23 is a block diagram of an example of an apparatus for performing an Integrated Access and Backhaul (IAB) operation (from a node perspective) according to an embodiment of the present specification.

Referring to FIG. 23, the processor 2300 may include an information receiving unit 2310 and an IAB operation performing unit 2320. Here, the processor 2300 may correspond to a processor in FIGS. 26 to 32 to be described later.

The information receiving unit 2310 may be configured to control the transceiver to receive at least one piece of timing advance (TA) information or T delta information from another node. Here, the downlink transmission timing of the node and the uplink transmission timing of the node may be aligned or determined based on the at least one piece of TA information or T delta information. In this regard, a more specific embodiment is the same as described above (and will be described later), so for convenience of description, repeated description of overlapping content will be omitted.

The IAB operation performing unit 2320 may be configured to perform an Integrated Access and Backhaul (IAB) operation based on the downlink transmission timing and the uplink transmission timing. In this regard, a more specific embodiment is the same as described above (and will be described later), so for convenience of description, repeated description of overlapping content will be omitted.

Although not shown separately, the present specification may also provide the following embodiments.

According to one embodiment, the node may be a node comprising a transceiver, at least one memory and at least one processor operatively coupled with the at least one memory and the transceiver, the at least one processor configured to perform an initial access operation with another node, control the transceiver to receive, from the another node, at least one timing advance (TA) information or T delta information, where downlink transmission timing of the node and uplink transmission timing of the node are aligned or determined based on the at least one TA information or T delta information, and perform an integrated access and backhaul (IAB) operation based on the downlink transmission timing and the uplink transmission timing.

According to another embodiment, the apparatus may be an apparatus comprising at least one memory and at least one processor operatively coupled with the at least one memory, the at least one processor configured to perform an initial access operation with another node, control a transceiver to receive, from the another node, at least one timing advance (TA) information or T delta information, where downlink transmission timing of the node and uplink transmission timing of the node are aligned or determined based on the at least one TA information or T delta information, and perform an integrated access and backhaul (IAB) operation based on the downlink transmission timing and the uplink transmission timing.

According to another embodiment, computer readable medium may be at least one computer readable medium including instructions based on being executed by at least one processor, the at least one processor configured to perform an initial access operation with another node, control a transceiver to receive, from the another node, at least one timing advance (TA) information or T delta information, where downlink transmission timing of the node and uplink transmission timing of the node are aligned or determined based on the at least one TA information or T delta information, and perform an integrated access and backhaul (IAB) operation based on the downlink transmission timing and the uplink transmission timing.

FIG. 24 is a flowchart of a method of transmitting at least one piece of timing advance (TA) information or T delta information (from the viewpoint of another node) according to an embodiment of the present specification.

According to FIG. 24, the at least one piece of TA information or T delta information may be transmitted to the child node (S2410). Here, the downlink transmission timing of the child node and the uplink transmission timing of the child node may be aligned based on the at least one piece of TA information or T delta information. In this regard, a more specific embodiment is the same as described above (and will be described later), so for convenience of description, repeated description of overlapping content will be omitted.

Figure 25:
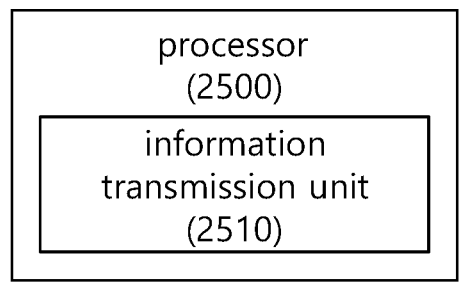
FIG. 25 is a block diagram of an example of an apparatus for transmitting at least one piece of timing advance (TA)

FIG. 25 is a block diagram of an example of an apparatus for transmitting at least one piece of timing advance (TA) information or T delta information (from the perspective of another node) according to an embodiment of the present specification.

Referring to FIG. 25, the processor 2500 may include an information transmission unit 2510. Here, the processor 2500 may correspond to a processor in FIGS. 26 to 32 to be described later.

The information transmission unit 2510 may be configured to control the transceiver to transmit at least one piece of timing advance (TA) information or T delta information to a child node. Here, the downlink transmission timing of the child node and the uplink transmission timing of the child node may be aligned based on the at least one piece of TA information or T delta information. In this regard, a more specific embodiment is the same as described above (and will be described later), so for convenience of description, repeated description of overlapping content will be omitted.

FIG. 26 shows an exemplary communication system (1), according to an embodiment of the present specification.

Referring to FIG. 26, a communication system (1) to which various embodiments of the present specification are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

Here, the wireless communication technology implemented in the wireless device of the present specification may include a narrowband Internet of Things for low-power communication as well as LTE, NR, and 6G. At this time, for example, NB-IoT technology may be an example of LPWAN (Low Power Wide Area Network) technology, and may be implemented in standards such as LTE Cat NB1 and/or LTE Cat NB2, it is not limited to the above-mentioned name. Additionally or alternatively, the wireless communication technology implemented in the wireless device of the present specification may perform communication based on LTE-M technology. In this case, as an example, the LTE-M technology may be an example of an LPWAN technology, and may be called by various names such as enhanced machine type communication (eMTC). For example, LTE-M technology is 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) may be implemented in at least one of various standards such as LTE M, and is not limited to the above-described name. Additionally or alternatively, the wireless communication technology implemented in the wireless device of the present specification may include at least one of ZigBee, Bluetooth, and Low Power Wide Area Network (LPWAN) in consideration of low power communication, it is not limited to the above-mentioned name. For example, ZigBee technology can create PAN (personal area networks) related to small/low-power digital communication based on various standards such as IEEE 802.15.4, It can be called by various names.

The wireless devices (100a~100f) may be connected to the network (300) via the BSs (200). An Artificial Intelligence (AI) technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or D2D communication), or inter BS communication (150c) (e.g., relay, Integrated Access Backhaul (IAB)). The wireless devices and the BSs/the wireless devices may transmit/receive radio signals to/from each other through the wireless communication/connections (150a, 150b, 150c). For example, the wireless communication/connections (150a, 150b, 150c) may transmit/receive signals through various physical channels. For this, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present specification.

Meanwhile, in NR, multiple numerologies (or subcarrier spacing (SCS)) for supporting various 5G services may be supported. For example, in case an SCS is 15 kHz, a wide area of the conventional cellular bands may be supported, and, in case an SCS is 30 kHz/60 kHz dense-urban, lower latency, and wider carrier bandwidth may be supported. In case the SCS is 60 kHz or higher, a bandwidth that is greater than 24.25 GHz may be used in order to overcome phase noise.

An NR frequency band may be defined as two different types of frequency ranges (FR1, FR2). The values of the frequency ranges may be changed (or varied), and, for example, the two different types of frequency ranges (FR1, FR2) may be as shown below in Table 4. Among the frequency ranges that are used in an NR system, FR1 may mean a "sub 6 GHz range", and FR2 may mean an "above 6 GHz range" and may also be referred to as a millimeter wave (mmW).

TABLE 4

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 5, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 5

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Hereinafter, an example of wireless devices to which the present specification is applied will be described in detail.

FIG. 27 shows an exemplary wireless device to which the present specification can be applied.

Referring to FIG. 27, a first wireless device (100) and a second wireless device (200) may transmit radio signals through a variety of RATs (e.g., LTE, NR). Herein, {the first wireless device (100) and the second wireless device (200)} may correspond to {the wireless device (100x) and the BS (200)} and/or {the wireless device (100x) and the wireless device (100x)} of FIG. 26.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including instructions for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present specification, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s)

(206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store various information related to operations of the processor(s) (202). For example, the memory(s) (204) may store software code including instructions for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF transceiver(s). In the present specification, the wireless device may represent a communication modem/circuit/chip.

Hereinafter, hardware elements of the wireless devices (100, 200) will be described in more detail. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, instructions, and/or a set of instructions.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. For this, the one or more transceivers (106, 206) may include (analog) oscillators and/or filters.

FIG. 28 shows another example of a wireless device applicable to the present specification.

According to FIG. 28, the wireless device may include at least one processor (102, 202), at least one memory (104, 204), at least one transceiver (106, 206), and/or one or more antennas (108, 208).

As a difference between the example of the wireless device described above in FIG. 27 and the example of the wireless device in FIG. 28, in FIG. 27, the processors 102 and 202 and the memories 104 and 204 are separated, but in the example of FIG. 28, the memories 104 and 204 are included in the processors 102 and 202.

Here, a detailed description of the processors 102 and 202, the memories 104 and 204, the transceivers 106 and 206, and the one or more antennas 108 and 208 is as described above, in order to avoid unnecessary repetition of description, description of repeated description will be omitted.

Hereinafter, an example of a signal processing circuit to which the present specification is applied will be described in detail.

FIG. 29 shows a signal process circuit for a transmission signal according to an embodiment of the present specification.

Referring to FIG. 29, a signal processing circuit (1000) may include scramblers (1010), modulators (1020), a layer mapper (1030), a precoder (1040), resource mappers (1050), and signal generators (1060). An operation/function of FIG. 29 may be performed, without being limited to, the processors (102, 202) and/or the transceivers (106, 206) of FIG. 27. Hardware elements of FIG. 29 may be implemented by the processors (102, 202) and/or the transceivers (106, 206) of FIG. 27. For example, blocks 1010~1060 may be implemented by the processors (102, 202) of FIG. 27. Alternatively, the blocks 1010~1050 may be implemented by the processors (102, 202) of FIG. 27 and the block 1060 may be implemented by the transceivers (106, 206) of FIG. 27.

Codewords may be converted into radio signals via the signal processing circuit (1000) of FIG. 29. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

More specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports, and M is the number of transport layers. The precoder (1040) may perform precoding after performing transform precoding (e.g., DFT) for complex modulation symbols. Additionally, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), frequency uplink converters, and so on.

Signal processing procedures for a signal received in the wireless device may be configured in a reverse manner of the signal processing procedures (1010~1060) of FIG. 29. For example, the wireless devices (e.g., 100, 200 of FIG. 27) may receive radio signals from the exterior through the antenna ports/transceivers. The received radio signals may be converted into baseband signals through signal restorers. For this, the signal restorers may include frequency downlink converters, Analog-to-Digital Converters (ADCs), CP remover, and Fast Fourier Transform (FFT) modules. Subsequently, the baseband signals may be restored to codewords through a resource demapping procedure, a postcoding procedure, a demodulation processor, and a descrambling procedure. The codewords may be restored to original information blocks through decoding. Therefore, a signal processing circuit (not shown) for a reception signal may include signal restorers, resource demappers, a postcoder, demodulators, descramblers, and decoders.

Hereinafter, a usage example of the wireless to which the present specification is applied will be described in detail.

FIG. 30 shows another example of a wireless device according to an embodiment of the present specification. The wireless device may be implemented in various forms according to a use-case/service (refer to FIG. 26).

Referring to FIG. 30, wireless devices (100, 200) may correspond to the wireless devices (100, 200) of FIG. 27 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 27. For example, the transceiver(s) (114) may include the one or more transceivers (106, 206) and/or the one or more antennas (108, 208) of FIG. 27. The control unit (120) is electrically connected to the communication unit (110), the memory (130), and the additional components (140) and controls overall operation of the wireless devices. For example, the control unit (120) may control an electric/mechanical operation of the wireless device based on programs/code/instructions/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 26), the vehicles (100b-1, 100b-2 of FIG. 26), the XR device (100c of FIG. 26), the hand-held device (100d of FIG. 26), the home appliance (100e of FIG. 26), the IoT device (100f of FIG. 26), a digital broadcast terminal, a hologram device, a public safety device, an MTC device, a medicine device, a fintech device (or a finance device), a security device, a climate/environment device, the AI server/device (400 of FIG. 26), the BSs (200 of FIG. 26), a network node, and so on. The wireless device may be used in a mobile or fixed place according to a usage-example/service.

In FIG. 30, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 30 will be described in detail with reference to the drawings.

FIG. 31 shows a hand-held device to which the present specification is applied. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 31, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a-140c correspond to the blocks 110~130/140 of FIG. 30, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/instructions (or commands) needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

FIG. 32 shows a vehicle or an autonomous vehicle to which the present specification is applied. The vehicle or autonomous vehicle may be implemented by a mobile robot, a car, a train, a manned/unmanned Aerial Vehicle (AV), a ship, and so on.

Referring to FIG. 32, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 30, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and so on.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Claims in the present specification may be combined in various ways. For instance, technical features in method claims of the present specification may be combined to be implemented or performed in an apparatus (or device), and technical features in apparatus claims may be combined to be implemented or performed in a method. Further, technical features in method claim(s) and apparatus claim(s) may be combined to be implemented or performed in an apparatus. Further, technical features in method claim(s) and apparatus claim(s) may be combined to be implemented or performed in a method.

What is claimed is:

1. A method a node in a wireless communication system, the method comprising:
    performing an initial access operation with another node;
    receiving, from the another node, one timing advance (TA) information among a plurality of TA information,
    wherein downlink transmission timing of the node and uplink transmission timing of the node are determined based on the one TA information; and
    performing an integrated access and backhaul (IAB) operation based on the downlink transmission timing and the uplink transmission timing,
    wherein, based on the node receiving specific TA information among the plurality of TA information, a use of a timing alignment case 6 by the node is triggered,
    wherein the timing alignment case 6 is a timing alignment case in which the uplink transmission timing of the node is aligned with the downlink transmission timing of the node, and
    wherein a specific reference signal (RS), which is specific to the timing alignment case 6 and is configured periodically, semi-periodically or aperiodically, is applied to the timing alignment case 6.

2. The method of claim 1, wherein the IAB operation includes mobile terminal (MT) operation or distributed unit (DU) operation,
    wherein the MT operation is operation related to a communication between the node and the another node,
    wherein the DU operation is operation related to a communication between the node and a child node or a communication between the node and a terminal.

3. The method of claim 1,
    wherein, based on the timing alignment case 6 being triggered, the node uses a first random access channel (RACH) resource among the first RACH resource and a second RACH resource in performing a RACH procedure, and
    wherein the first RACH resource is a RACH resource configured for the timing alignment case 6 and the second RACH resource is a RACH resource configured for a timing alignment case other than the timing alignment case 6.

4. A node comprising:
    a transceiver;
    at least one memory; and
    at least one processor operatively coupled with the at least one memory and the transceiver, the at least one processor configured to:
    perform an initial access operation with another node;
    control the transceiver to receive, from the another node, one timing advance (TA) information among a plurality of TA information,
    wherein downlink transmission timing of the node and uplink transmission timing of the node are determined based on the one TA information; and
    perform an integrated access and backhaul (IAB) operation based on the downlink transmission timing and the uplink transmission timing,
    wherein, based on the node receiving specific TA information among the plurality of TA information, a use of a timing alignment case 6 by the node is triggered,
    wherein the timing alignment case 6 is a timing alignment case in which the uplink transmission timing of the node is aligned with the downlink transmission timing of the node,
    wherein a specific reference signal (RS), which is specific to the timing alignment case 6 and is configured periodically, semi-periodically or aperiodically, is applied to the timing alignment case 6.

5. A method for transmitting one timing advance (TA) information in a wireless communication system, the method performed by a node and comprising:
    performing an initial access operation with a child node;
    transmitting, to the child node, one TA information among a plurality of TA information,
    wherein downlink transmission timing of the child node and uplink transmission timing of the child node are determined based on the one TA information,
    wherein, based on the node transmitting specific TA information among the plurality of TA information, a use of a timing alignment case 6 by the child node is triggered,
    wherein the timing alignment case 6 is a timing alignment case in which the uplink transmission timing of the child node is aligned with the downlink transmission timing of the child node,
    wherein a specific reference signal (RS), which is specific to the timing alignment case 6 and is configured periodically, semi-periodically or aperiodically, is applied to the timing alignment case 6.

* * * * *